(12) United States Patent
Stewart et al.

(10) Patent No.: US 7,362,003 B2
(45) Date of Patent: Apr. 22, 2008

(54) COIL SWITCHING CIRCUIT FOR LINEAR ELECTRIC GENERATOR

(75) Inventors: David B. Stewart, Cranbury, NJ (US); Paul Smalser, Hamilton, NJ (US); Henry I. Schanzer, Edison, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 101 days.

(21) Appl. No.: 11/030,932

(22) Filed: Jan. 7, 2005

(65) Prior Publication Data

US 2005/0218728 A1   Oct. 6, 2005

Related U.S. Application Data

(60) Provisional application No. 60/553,666, filed on Mar. 16, 2004.

(51) Int. Cl.
*F03B 13/10* (2006.01)
*F03B 13/12* (2006.01)
*H02P 9/04* (2006.01)
*H02X 41/00* (2006.01)

(52) U.S. Cl. .............................. 290/42; 290/53; 310/13
(58) Field of Classification Search ................. 290/43, 290/42, 53, 54; 310/27, 13, 17, 15
See application file for complete search history.

(56) References Cited

U.S. PATENT DOCUMENTS

| | | | | |
|---|---|---|---|---|
| 3,525,887 A * | 8/1970 | D'Ewart, Jr | ................. | 310/27 |
| 3,696,251 A * | 10/1972 | Last et al. | ..................... | 390/53 |
| 4,260,901 A * | 4/1981 | Woodbridge | ................. | 290/42 |
| 4,500,827 A * | 2/1985 | Merritt et al. | ................. | 322/3 |
| 4,541,787 A * | 9/1985 | DeLong | ..................... | 417/417 |
| 4,692,673 A * | 9/1987 | DeLong | ..................... | 318/132 |
| 4,945,269 A * | 7/1990 | Kamm | ........................ | 310/15 |
| 5,347,186 A * | 9/1994 | Konotchick | .................. | 310/17 |
| 5,818,132 A * | 10/1998 | Konotchick | .................. | 310/17 |
| 5,850,111 A * | 12/1998 | Haaland | ...................... | 310/15 |
| 6,246,131 B1 * | 6/2001 | Sheng | ......................... | 310/12 |
| 6,515,375 B1 * | 2/2003 | Beal | ............................ | 290/42 |
| 6,864,592 B1 * | 3/2005 | Kelly | .......................... | 290/42 |
| 7,141,888 B2 * | 11/2006 | Sabol et al. | .................. | 290/53 |
| 7,164,212 B2 * | 1/2007 | Leijon et al. | ................. | 290/42 |
| 7,168,532 B2 * | 1/2007 | Stewart et al. | ............. | 188/161 |
| 2002/0195884 A1 * | 12/2002 | Ichii et al. | .................... | 310/15 |
| 2007/0126239 A1 * | 6/2007 | Stewart et al. | ................ | 290/53 |

* cited by examiner

*Primary Examiner*—Julio C. Gonzalez
(74) *Attorney, Agent, or Firm*—Henry I. Schanzer

(57) ABSTRACT

In a linear electric generator (LEG) which includes apparatus for passing a permanent magnetic assembly (PMA) along linearly disposed sections of coils of an induction coil assembly (ICA) for generating voltages and power, a switching arrangement for coupling only selected sections of coils of the ICA across the power output lines of the LEG. The selected coil sections include the sections of coils of the ICA in close proximity to the passing PMA. In accordance with different embodiments, the non selected coils of the ICA may be either short circuited or disconnected (open circuited) from the power output lines.

33 Claims, 25 Drawing Sheets

FIGURE 1 - Prior Art

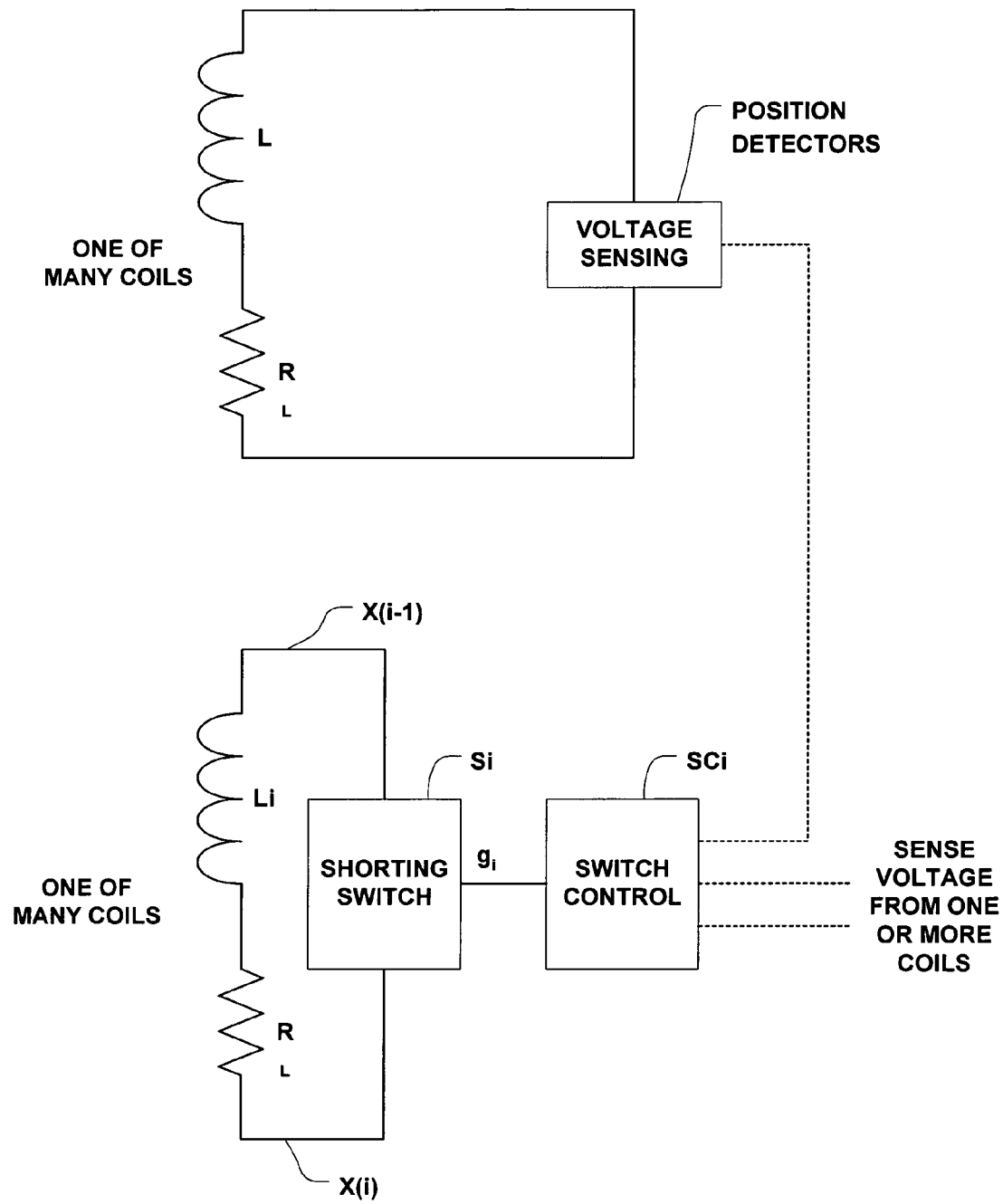
FIGURE 6A1

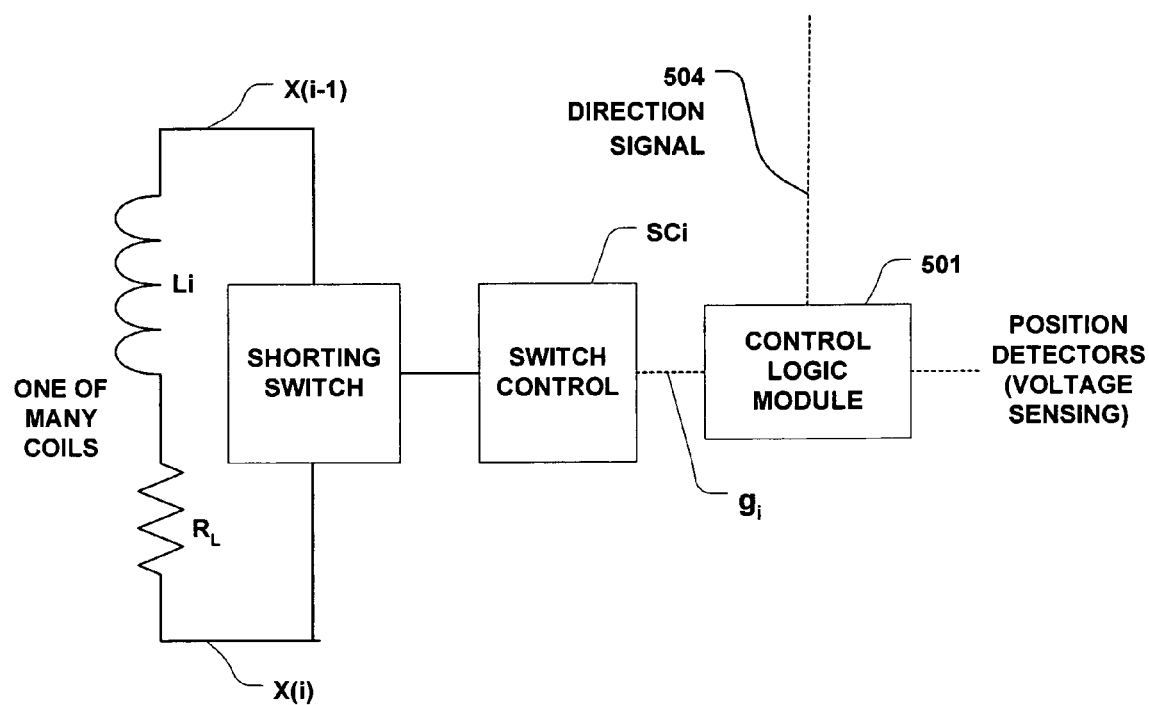
FIGURE 6A2

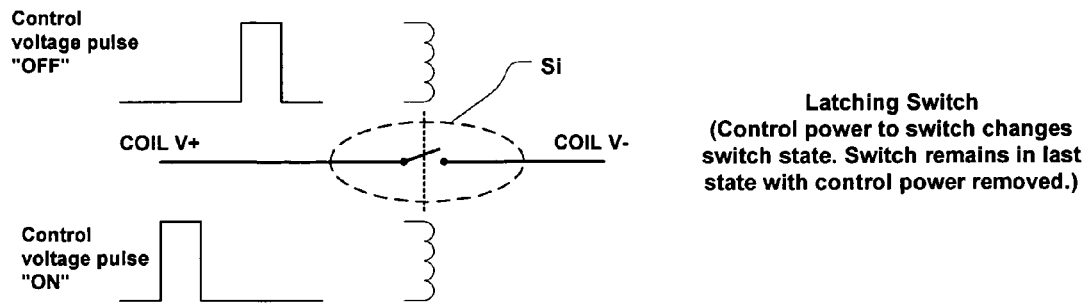
FIGURE 6C1
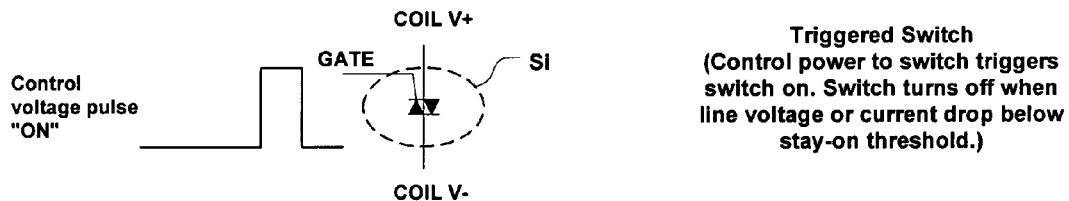
FIGURE 6C2
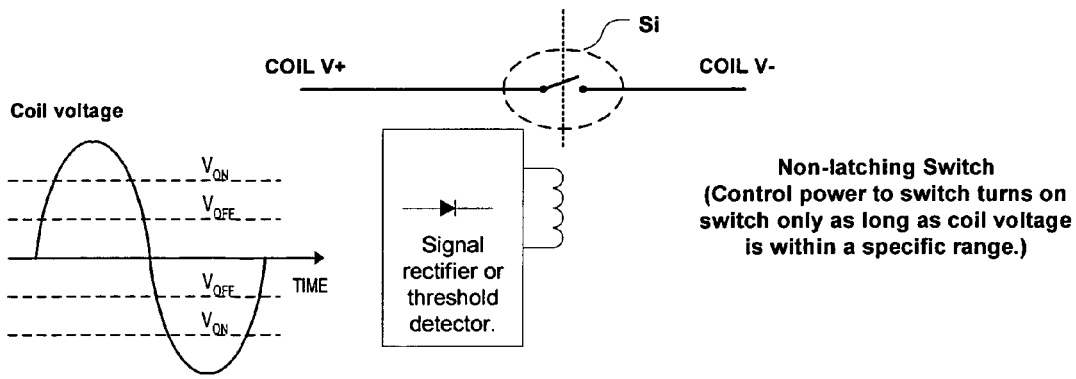
FIGURE 6C3

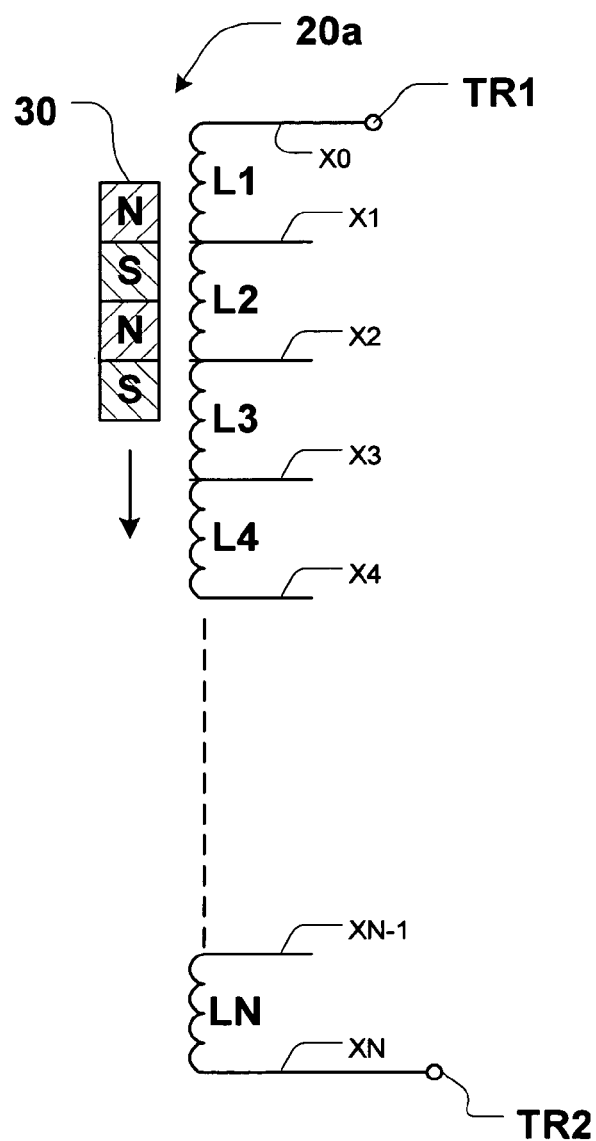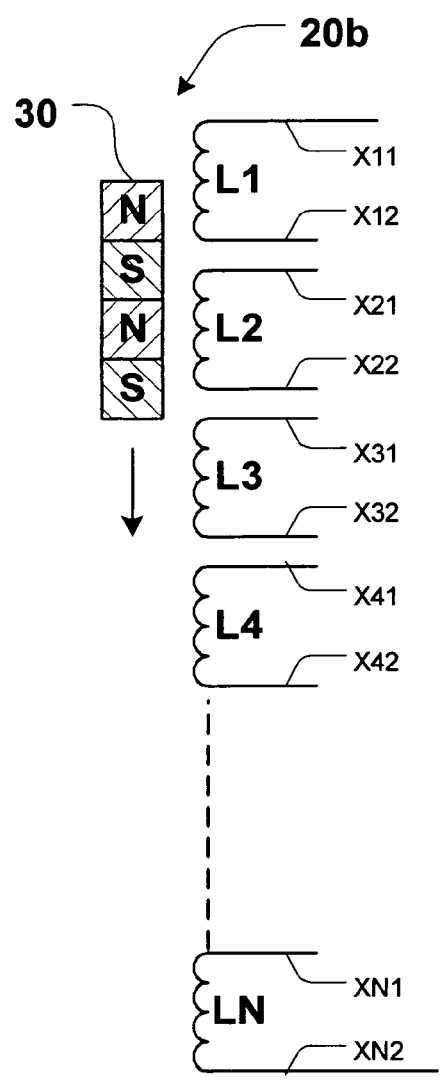
FIGURE 10A
FIGURE 10B

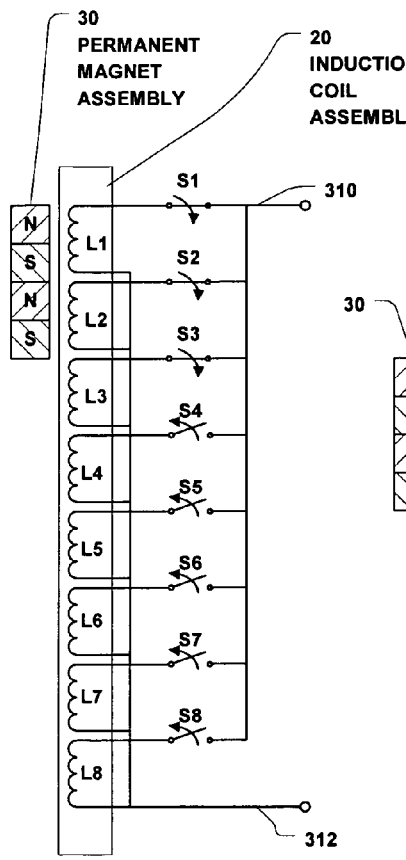
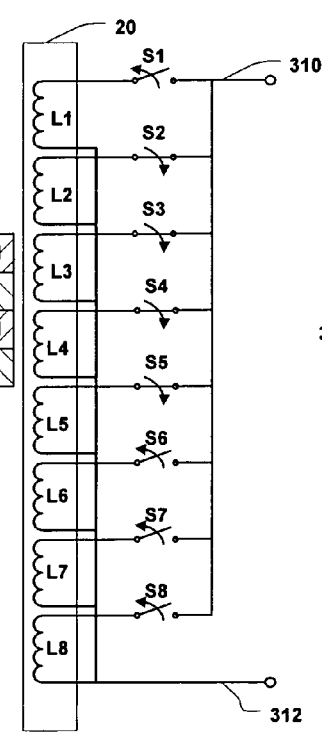
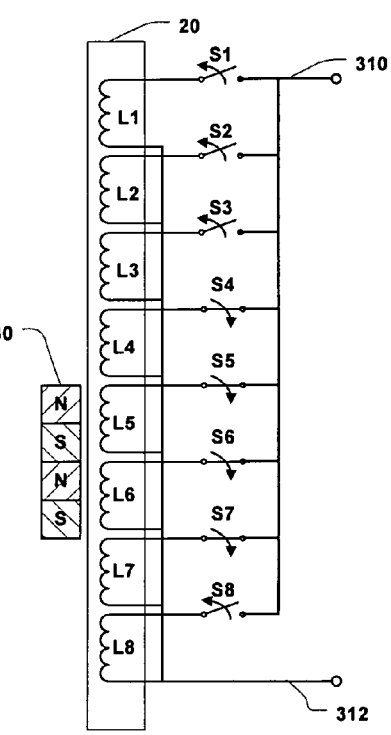
FIGURE 11A　　　　　FIGURE 11B　　　　　FIGURE 11C
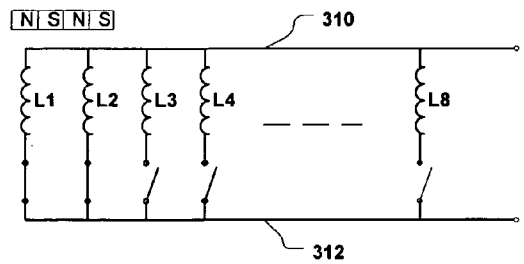
FIGURE 11D

COIL SWITCHING CIRCUIT FOR LINEAR ELECTRIC GENERATOR

CROSS REFERENCES TO RELATED APPLICATIONS

This application claims priority from provisional patent application Ser. No. 60/553,666 titled Wave Energy Converters (WECs) with Linear Electric Generators (LEGs) filed Mar. 16, 2004, the teachings of which are incorporated herein by reference.

BACKGROUND OF THE INVENTION

This invention relates to linear electric generators (LEGs) and to circuitry for improving their efficiency. A problem with known LEGs may be best explained with reference to prior art FIGS. 1 and 2. A LEG may be constructed, as shown in FIGS. 1 and 2, so as to have a long stator (e.g., an induction coil assembly 24 of length d1) and a relatively short permanent magnet assembly 22, of length d2. When the permanent magnet assembly 22 moves relative to the induction coil assembly 24 a voltage (and a current if a load is connected across the coil assembly) is induced in the coil assembly. An advantage of systems in which the coil is made much longer than the magnet, as compared to those with long permanent magnet assemblies and short induction coil (stator) assemblies, includes the ability to hold the wiring of the induction coil assembly stationary (i.e., cables are not continually moved or flexed). Another advantage of such systems is that the long coils and short permanent magnet enable the use of relatively simple passive permanent magnet dampers/brakes (e.g., passive dampers can be formed by placing conductive plates at the ends of the travel of the permanent magnets to form a passive damper or brake). Still another advantage of having a relatively short permanent magnet is that big and long magnets present a hazard in that they tend to attract a large amount of debris.

Although the structure shown in FIG. 1 has many advantages, a problem with known linear electric generators having a long induction coil assembly and a relatively short permanent magnet assembly is that the electric current generated in the coils has to pass (flow) through the entire coil assembly (i.e., all the coils) in the stator, as illustrated in FIG. 1. The useful voltage derived from the coils is obtained from those coils and coil sections directly opposite and very close to the permanent magnet assembly. This useful voltage induces a current which flows through all the series connected coils. The portions of the stator coils that are not adjacent (or directly opposite) to the permanent magnet assembly and those that do not interact with the magnet assembly cause a voltage drop in the coil (i.e., due to the resistance and inductance of the coil) without enhancing the generation of additional current or voltage. The voltage drop due to the resistance/impedance of the coils not contributing to the generation of voltage (current) results in significant losses in the power being generated by the LEG. The problem of having significant power losses which detract from useful power generation is overcome in circuits and systems embodying the invention.

SUMMARY OF THE INVENTION

A linear electric generator (LEG) embodying the invention includes an induction coil assembly (ICA), a permanent magnetic assembly (PMA) and switching circuitry for coupling only selected sections of the coils of the ICA across the power outputs of the LEG via the very low impedance path provided by the switching circuitry. The selected coil sections are those which are "active" or "excited" because they are in close proximity (i.e., "active" or "excited") to the PMA.

In certain embodiments of the invention, coil sections which are not in close proximity to the PMA are short circuited by the switching circuitry. In other embodiments, the coil sections which are not in close proximity to the PMA are open circuited via the switching circuitry. Thus, the switching circuitry may be used to cause the induction coils which are distant from the PMA (i.e., inactive or unexcited) and which are not contributing to the generation of voltage and current to be bypassed either by open circuiting (disconnecting) or shorting the "inactive" coil sections. Disconnecting or shorting the inactive coils decreases or eliminates losses due to their series coil resistance and impedance and thereby increases the efficiency of the linear electric generator.

A LEG embodying the invention includes a relatively long ICA and a relatively short PMA. The ICA is subdivided into N sections which are linearly disposed along a surface (e.g., a shaft or a float of a wave energy converter—WEC-) over a distance (e.g., d1). The length of the PMA may vary over a wide range from being less than the length of one coil section to being longer than several coil sections. In some embodiments, the PMA is selected to have a length equal to the length of "X" of the N coil sections, where X and N are integers and X is less than N. For example, the induction coil assembly may consist of 10, or more, coil sections extending serially along a distance (e.g., d1) and the length (e.g., d2) of the PMA may be equal to the length of two coil sections.

In systems embodying the invention, three possible modes of moving the ICA relative to the PMA may be employed: (a) the ICA may be held stationary and the PMA moves relative to the coil assembly; (b) the PMA is held stationary and the ICA moves relative to the PMA; or (c) the ICA and the PMA can both move relative to each other. In the description to follow, for ease of illustration, the coil assembly is shown to be stationary and the PMA moves along the coil assembly while being separated from it by a pre-selected distance ("gap"). However, the invention may be practiced using any of the three modes of operation noted above.

Applicants' invention resides in part in the recognition that as the PMA moves along the coils a significant voltage is induced in the coils opposite and in close proximity to (i.e., near) the PMA and little, if any, voltage is induced in the coils not near the PMA.

In one embodiment of the invention the coil sections are connected in series between first and second power out put points and switches are connected across the coil sections. As the PMA passes along the length of the ICA, the switches connected across the sections of the coil assembly which are near the PMA are "opened" allowing a voltage to be induced in those coil sections. Concurrently, the switches connected across the coils which are not near the PMA are "closed" for short circuiting those sections and simultaneously providing a low impedance conduction path for connecting the active coils across the first and second power outputs of the LEG to which a load may be connected. Thus, the voltage developed across the active coils is applied to the power outputs with very little power dissipation in the inactive coils.

In another embodiment of the invention, each coil has first and second terminals and each coil terminal is connected via a selectively enabled switch to a first or to a second power output point. The sections of the coil assembly which are near the PMA are coupled between the first and second power output points via switches. The "inactive" coil sections which are not near the PMA are disconnected from the power output points and do not dissipate any power.

The turn on (closing) and turn off (opening) of the switching circuitry coupling the coils to the power lines of the LEG may be controlled by different means for sensing the position and/or the direction of the PMA relative to the ICA. In some embodiments, the voltages of individual (stator) coil sections are sensed. Voltages of significant amplitude are developed across the "active" or "excited" coil sections near the PMA. The coil sections which are not near the PMA will not develop induced voltages of any significant amplitude. The voltage developed in the "active" or "excited" coil sections is detected to provide positional and/or directional information which is used to control the condition of the switching circuitry. Alternatively, optical sensors and light emitters or Hall effect sensors located on the PMA and the ICA may be used for position and/or direction sensing.

In all instances, selected active or excited coils are coupled to the LEG output via turned on switches and the inactive coil sections are shorted out or disconnected from the circuit. As a result, the voltage drop in the stator coil assembly due to the resistance and impedance of the "inactive" coils is reduced and/or eliminated, thereby decreasing the power loss in the inactive coils and increasing the efficiency of the linear electric generator.

LEGs embodying the invention are very useful as power take off devices (PTOs) in wave energy converters (WECs).

BRIEF DESCRIPTION OF THE DRAWINGS

In the accompanying drawing like reference characters denote like components.

FIGS. 6A1, 6A2, 6B and 6C are semi-schematic semi-block diagrams of different switching networks for switching the coils of LEGs in accordance with the invention;

FIG. 6C1, 6C2, 6C3 show different types of bypass switches useful in. practicing the invention;

FIGS. 10A and 10B are, respectively, schematic representations of a "tapped" induction coil assembly and of a "segmented" induction coil assembly for use in practicing the invention;

FIGS. 11A, 11B, 11C and 11D are diagrams illustrating the switching of "segmented" coils disposed linearly along a shaft or shell but which are electrically interconnected in a parallel configuration.

DETAILED DESCRIPTION OF THE INVENTION

Figure 1:
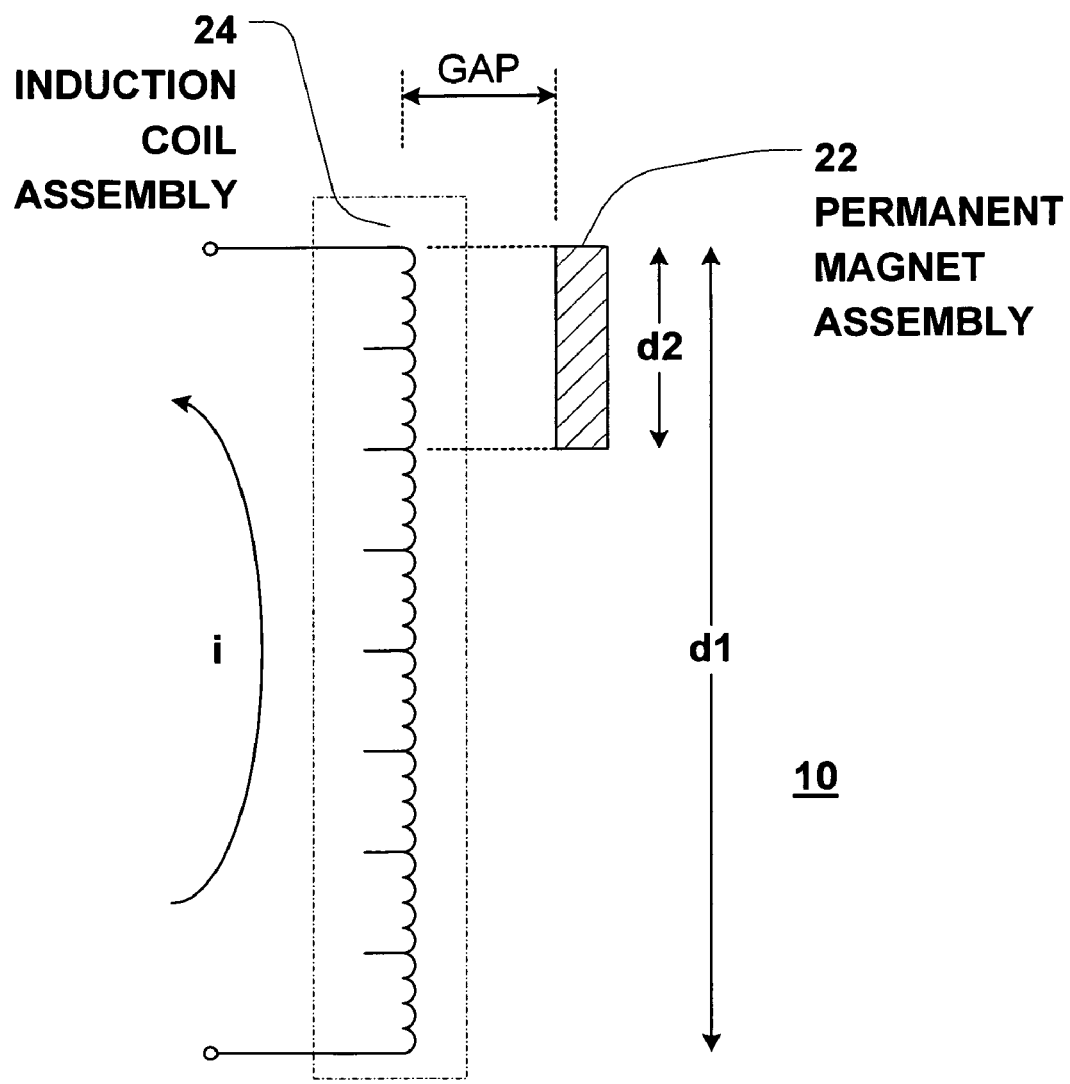
FIG. 1 is a schematic diagram illustration of the permanent magnet and coil assemblies of a prior art linear electric generator (LEG)

Features and various structures of linear electric generators (LEGs) embodying the invention are shown in FIGS. 3-12. In these figures, for ease of description, only one of three possible electrical phases is shown. However, it should be understood that the apparatus may, and typically will, include one or more (e.g. 3) phases. One application of linear electric generators (LEGs) embodying the invention is as a power take off (PTO) device in wave energy converters (WECs). However, it should be understood that a LEG embodying the invention may be used in any other suitable application. As shown in the figures, LEGs embodying the invention include a permanent magnetic assembly (PMA) 30 and an induction coil assembly (ICA) 20 separated by a small air gap. In this application it is assumed that the length (d2) of the PMA 30 is significantly smaller than the length (d1) of the ICA 20. In a WEC embodying the invention, the PMA 30 is attached to (or mounted on) one of a shaft 3 and shell 5, and the ICA 20 is attached to (or mounted on) and disposed along the other one of the shaft 3 and shell 5 as shown in FIGS. 3D and 3E. As noted above, the shaft or the shell may move relative to the other, or both may move relative to each other.

The PMA 30 is typically constructed of multiple pairs of "north" and "south" polarized magnets mounted on the surface of a ferromagnetic material structure (e.g. steel) with the poles oriented perpendicular to the line of the air gap . These magnets comprise a magnetic "pole pair". The magnetic circuit may be comprised of a pair of magnets, "air" gaps, a stator yoke, and a magnet backing plate, the latter two items being constructed of ferromagnetic material.

The PMA 30 may also be constructed of multiple pairs of north and south polarized magnets "buried" in a ferromagnetic yoke. In this case, the north and south poles are oriented parallel to the air gap. In such a case, the magnetic circuit may be comprised of magnets, two air gap crossings, and ferromagnetic and stator yokes. Note that any suitable PMA structure may be used to practice the invention.

The ICA 20 used to practice the invention when referred to generically includes a "tapped" coil configuration shown as 20a in FIG. 10A or a "segmented" coil configuration shown as 20b in FIG. 10B. The ICA 20 coil configuration of the invention differs from the ICA 24 shown in FIG. 1 in that the ICA 20 includes taps which are brought out to enable connections or contacts to be made to the different and individual coil sections of the ICA.

The basic operation of the system may be described as follows. Assume that the PMA 30 is impelled to move relative to and along the ICA 20 in response to naturally occurring forces (e.g., ocean waves). As the PMA 30 moves along the coils, from which it is separated by a small air gap, a change in flux is produced. The changing flux caused by the moving magnets induces a voltage in the coils that are near (in close proximity to) the magnets ($e=Nd\phi/dt$); these coils are also referred to herein and in the accompanying claims as "active" coils or "excited" coils. The amplitude and frequency of the voltage induced in each individual active coil is a function of the speed of the magnet(s) relative to the coils and of the magnet-coil coupling properties. When an external load is connected across the terminals of an "active" coil or coils, current flows through the coils and the load. Note that there is very little, if any, useful voltage developed across the coils which are not in close proximity to the PMA 30.

Figure 4:
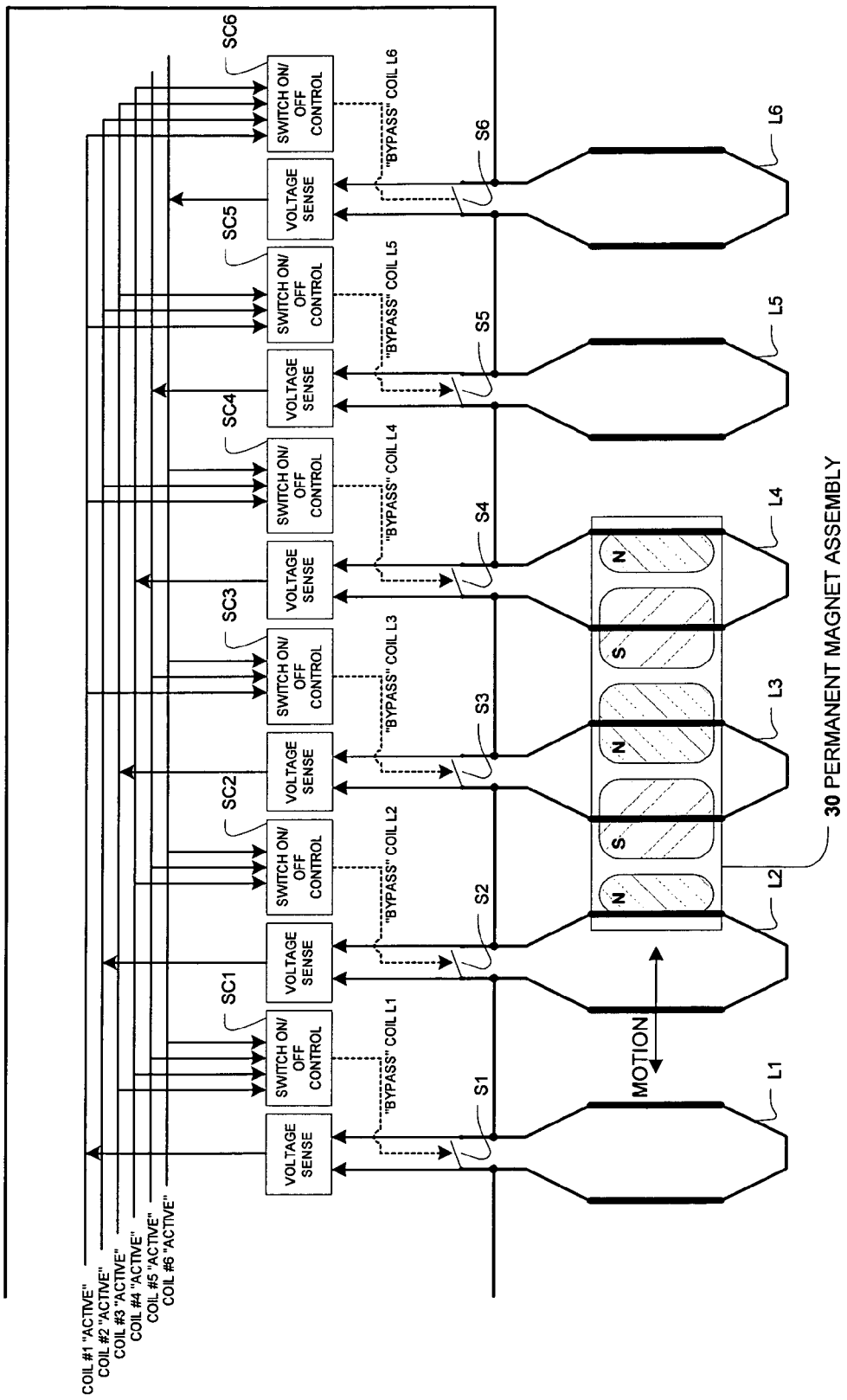
FIG. 4 is a schematic diagram illustrating a single phase LEG with coil switching circuitry in accordance with the invention.

A voltage is generated in active segments of the coil as a result of the changing magnetic flux as the PMA passes over the coils. Flux from a pair of "north" and "south" polarized magnets is coupled to the coil segment via an air gap. The length of each coil segment may be equal to the length of one of these magnet pole pairs. A PMA may consist of several pole pairs and extend over one, or more, coil segments, as shown in FIG. 4.

Figure 3A:
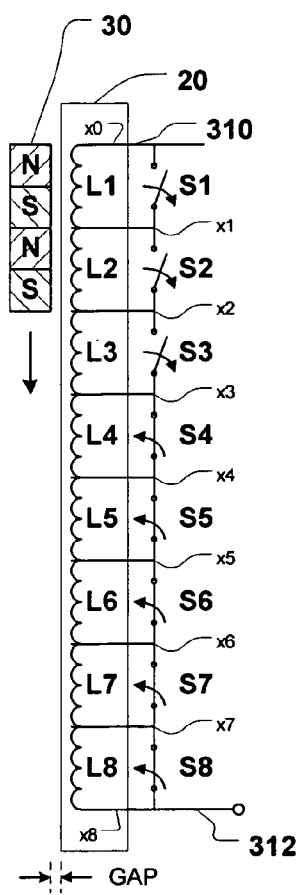
FIGS. 3A, 3B and 3C are schematic diagrams of a LEG with shorting switches connected across sections of the induction coil assembly (ICA) in accordance with one aspect of the invention.
Figure 3B:
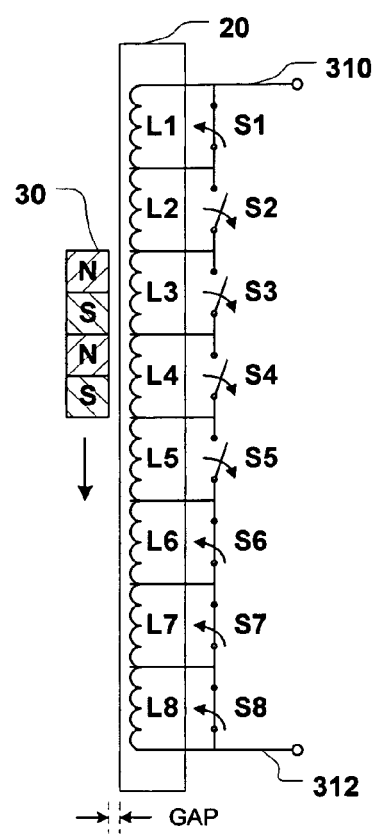
Figure 3C:
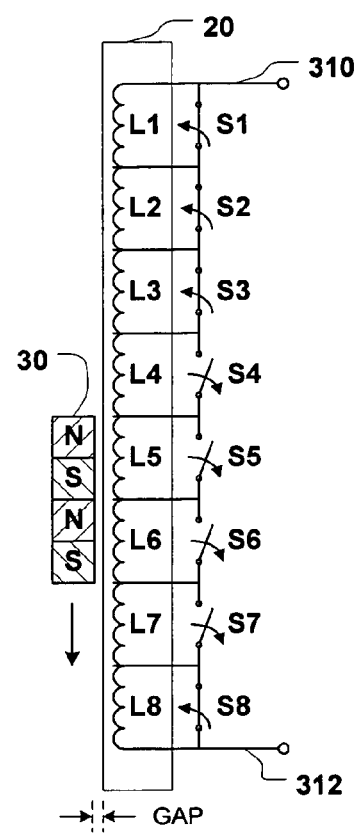
Figure 3D:
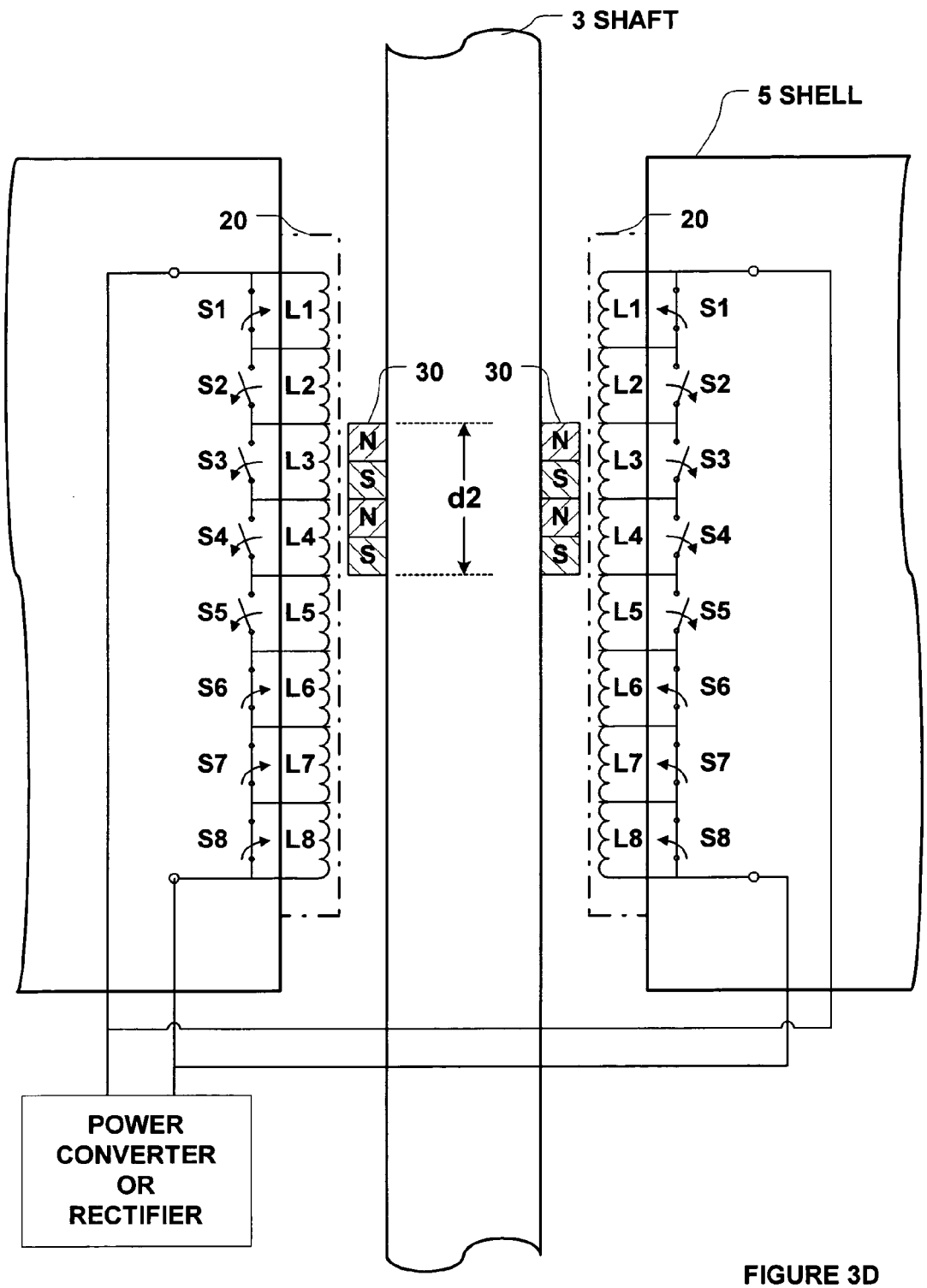
FIGS. 3D and 3E illustrate different ways of mounting a LEG embodying the invention in a wave energy converter (WEC)
Figure 3E:
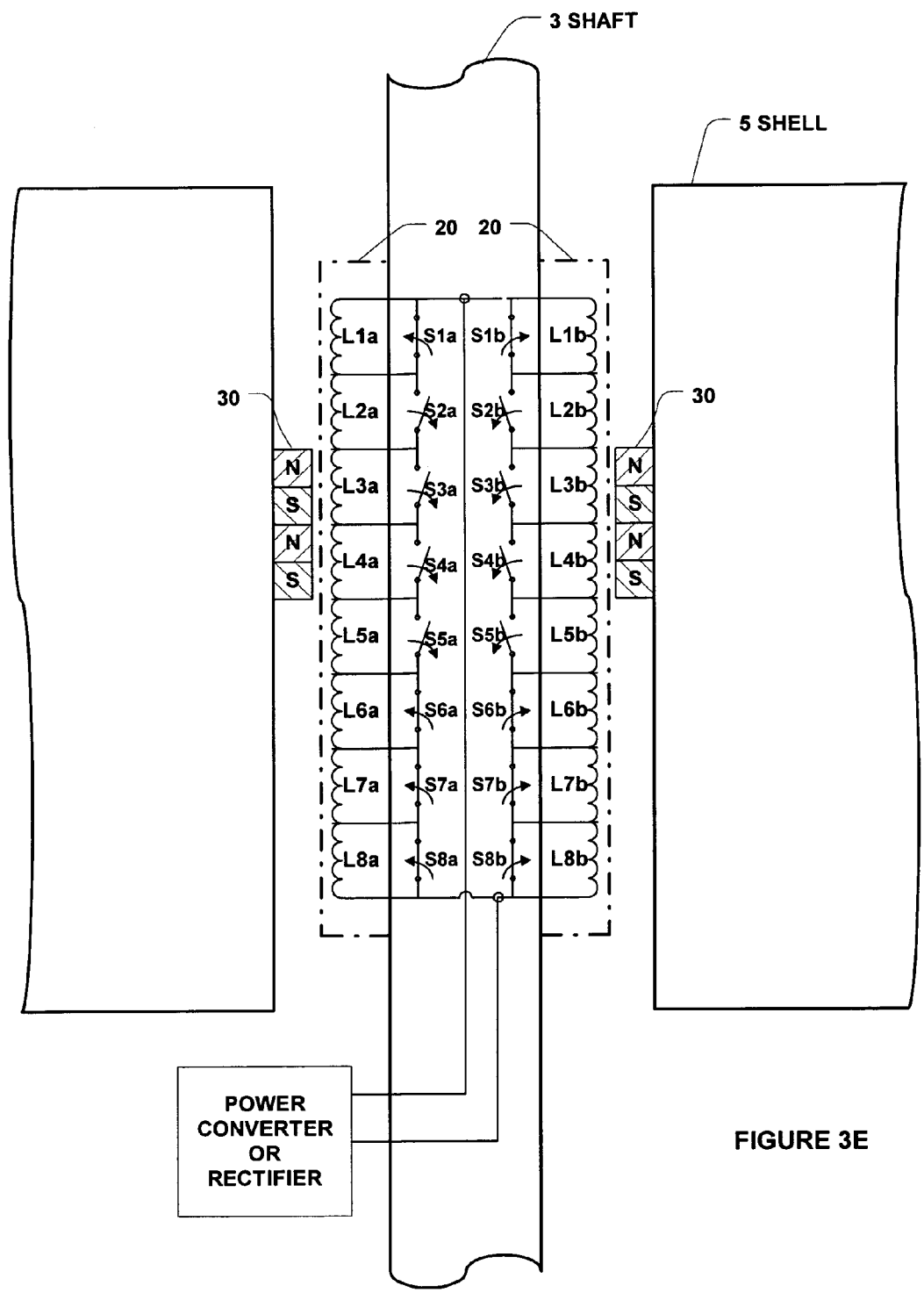

Referring to FIGS. 3A, 3B and 3C, there is shown 8 induction coils (L1-L8) of a LEG connected in series between power output points 310 and 312. A selectively enabled shorting switch (S1-S8) is connected across each induction coil. In FIGS. 3A, 3B and 3C, it is assumed that the length of the PMA 30 is approximately equal to the length of two series connected coils. The shorting switches of the "active" or "excited" coils (i.e., those coils in physical proximity and opposite the PMA 30) are opened (OFF). In addition, the shorting switches of the coils immediately above and below the position of the PMA 30 are also opened (OFF) to ensure that all the significant amounts of generated magnetic flux are collected (and do not get shorted). The shorting switches across the remaining coils are closed for effectively shorting out the non-active coils (i.e., those not contributing to the generation of an output voltage) and concurrently providing a conduction path for coupling the active coils between the power output terminals. Thus, in circuits embodying the invention the active or excited coils are coupled across the power output points (310, 312) of the ICA 20 via the relatively low impedance path of switches which are turned on and the IR drops of the inactive coils are shorted and thus bypassed.

Figure 7:
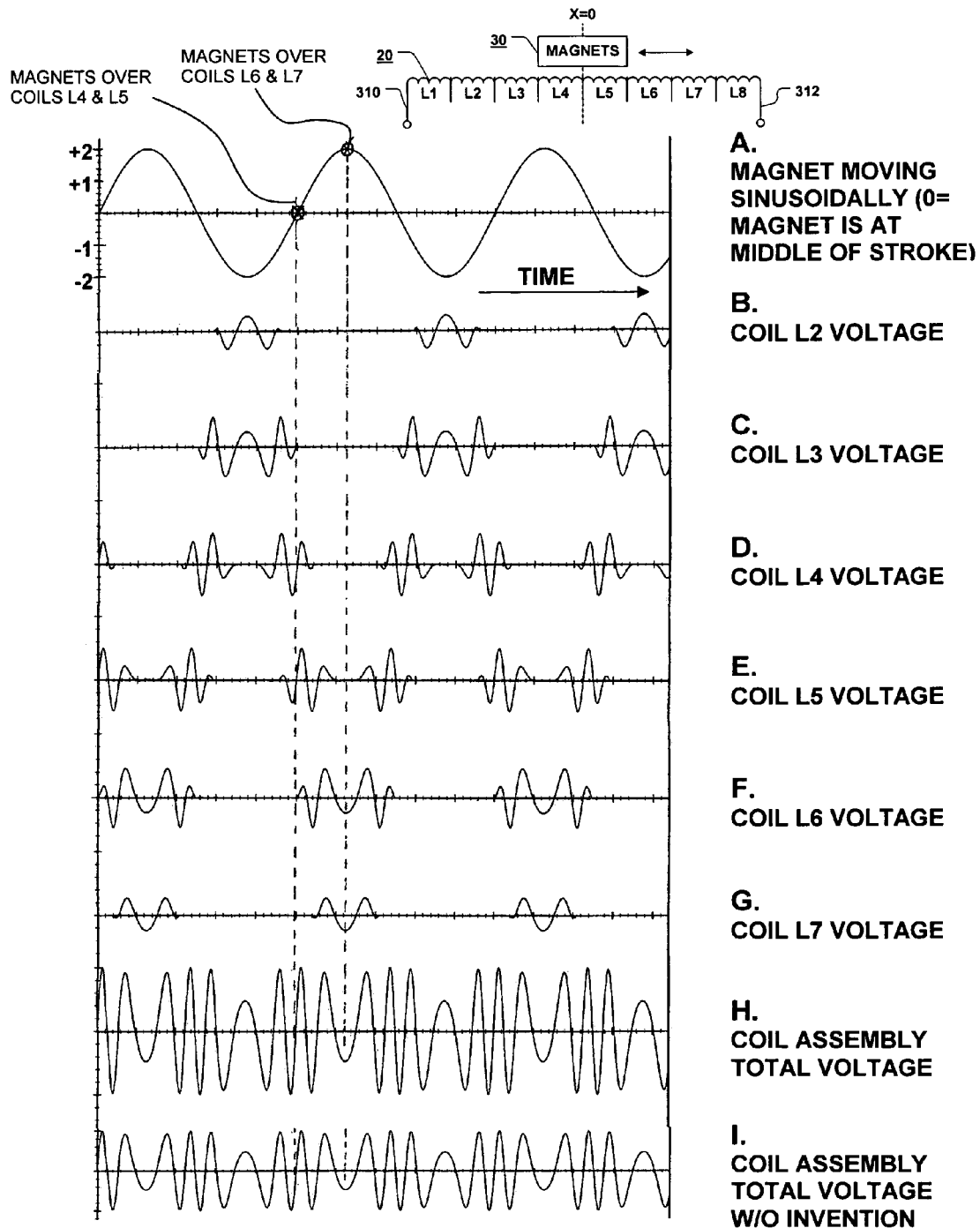
FIG. 7 is a waveform diagram illustrating the operation of a LEG embodying the invention.

As the PMA 30 moves along the ICA 20 an output voltage (Vo) is produced between terminals 310 and 312 and at the various coil taps which may, for example, have a form of the type shown in the various waveforms of FIG. 7. For the length of the PMA 30 assumed to be equal to the length of 2 induction coils and assuming that the PMA 30 is moving down as shown in FIGS. 3A, 3B and 3C, the switch closures may be describes as follows: (a) in FIG. 3A with PMA 30 opposite coils L1 and L2, switches S1, S2 and S3 are opened while switches S4 through S8 are closed, shorting coils L4 through L8. Thus, coils L1, L2, and L3, which are considered to be "excited" and across which a useful voltage is produced, are effectively connected in series between power outputs 310 and 312 via the low impedance path of turned-on switches S4-S8, also connected in series. (b) As the magnetic assembly moves down opposite coils L3 and L4 as shown in FIG. 3B, switches S2, S3, S4, and S5 are opened while switches S1 and S6-S8 are closed shorting their corresponding coil windings. Thus, 4 series connected coils (L2, L3, L4 and L5), which are considered to be "excited" and across which a useful voltage is produced, are effectively connected across output points 310 and 312 via the low impedance path provided by turned-on switches S1, S6, S7 and S8. (c) Likewise, when the PMA 30 moves down opposite coils L5 and L6 as shown in FIG. 3C, switches S4, S5, S6, and S7 are opened while switches S1-S3 and S8 are closed shorting their corresponding coil windings. Thus, 4 series connected coils (L4, L5, L6 and L7) are effectively connected across points 310 and 312 via the low impedance. path provided by turned-on switches S1, S2, S3 and S8.

For the example above, a minimum of 3 switches have to be opened at any time with a fourth switch being also opened to anticipate the reversal of travel of the PMA 30 and for control purposes. Clearly, the coils opposite the PMA 30 have to be enabled (the short circuit across the coils has to be removed) so their outputs can be fed across the power output lines 310, 312. In addition, to anticipate the travel of the PMA 30 in either direction and to prepare the circuitry for such travel, the one set of coils immediately above and immediately below the "active" coils are also enabled (the short circuit across these coils has to be removed). It should be evident that as the PMA 30 moves down along the ICA 20 that the process of opening and closing switches is continuously repeated. Thus, in circuits and systems embodying the invention, the coils in close proximity to the PMA are coupled across the power outputs via turned on switches.

Due to the alternating nature of voltages being generated (see the waveforms in FIG. 7, and in particular waveform H), the design of the switches and the control circuitry for turning the switches on and off presents significant problems which may be overcome by circuitry embodying the invention, as discussed below.

Figure 5:
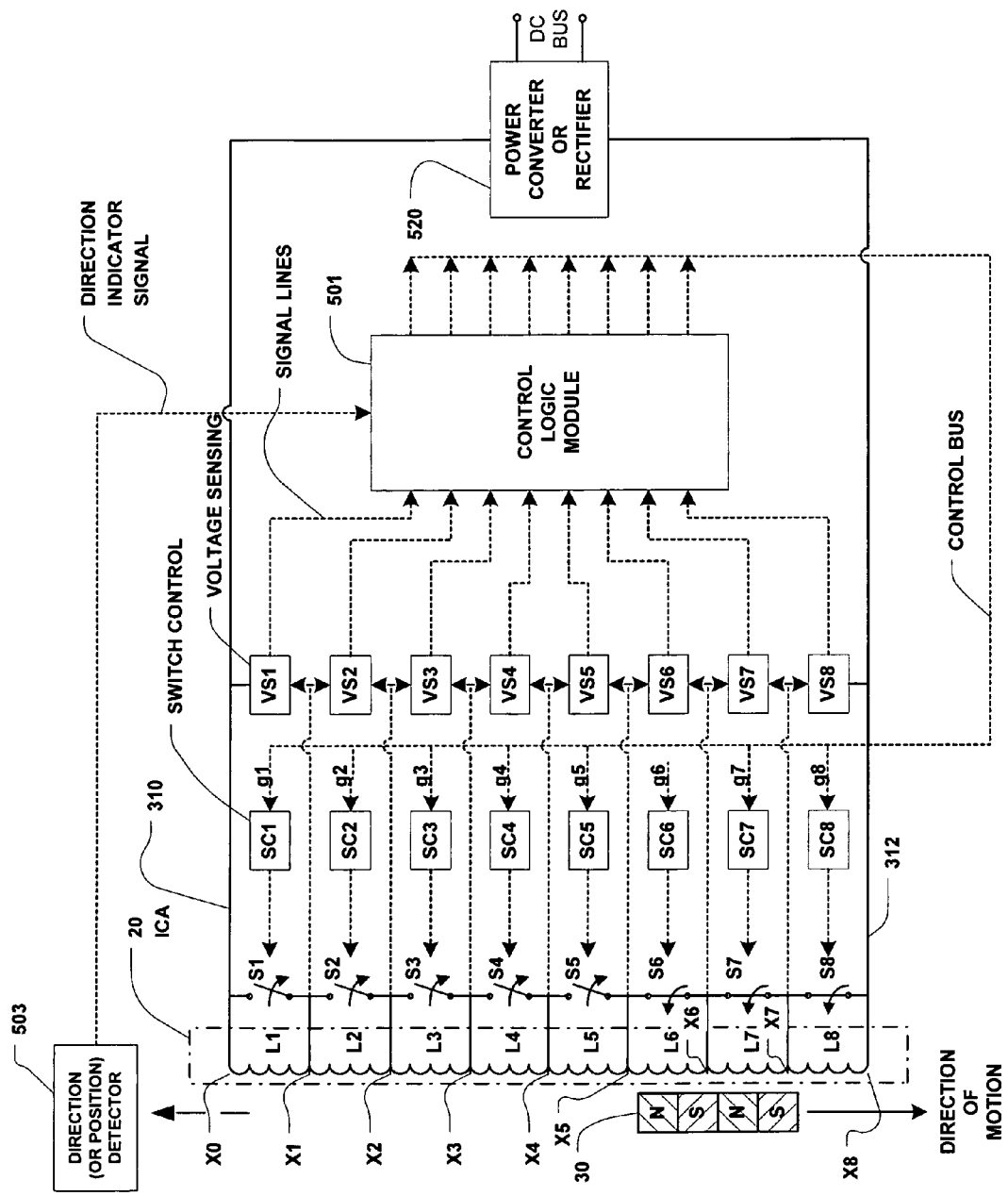
FIGS. 5 and 5A are schematic diagrams of LEG systems embodying the invention.
Figure 5A:
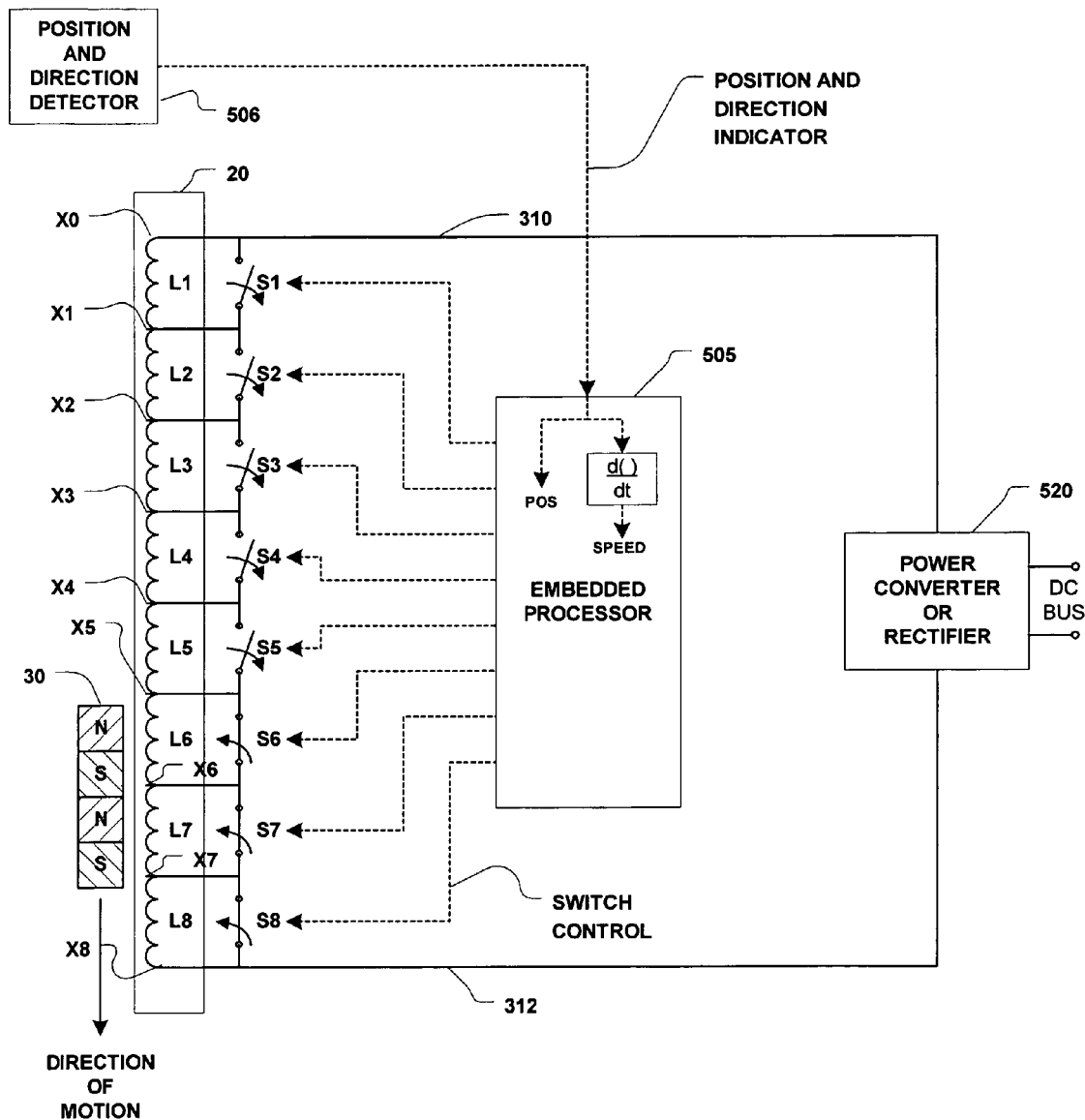

As shown in FIGS. 4, 5 and 5A, voltage sensing circuitry (VSi) may be coupled across each coil winding (Li) to sense the voltage developed across its winding. In FIG. 4, voltages sensed (or present) across the coils (Li) are applied to switch control modules (SCi) whose outputs are connected to shorting or bypassing switches (Si). The amplitude of the signals sensed may be used to provide an indication of the position (and direction) of the PMA 30. The positional information as to the location of the PMA 30 may then be used to control the opening and the closing of the shorting switches S1-S8, and or the opening and closing of bypassing or coupling switches shown in various Figures.

The combination of voltage sensing and logic modules, as shown in FIG. 4, may obviate the need for directional detection, since the change in voltage in the coils as the PMA moves along the coils can be used to effectively indicate the direction of motion. Thus, voltage sensing as suggested herein may be used for determining both position and direction, if required.

FIG. 5 shows 8 coils (L1-L8) with a selectively enabled shorting switch (S1-S8) connected across each coil for selectively shorting its corresponding coil; with each switch having a corresponding switch control circuit (SC1-SC8). The status (ON or OFF) of each switch (S1-S8) is controlled by its corresponding switch control circuit (SC1-SC8). The switch control circuits are driven by control signals (g1-g8) produced at the output of a control logic module 501. In FIG. 5, a voltage sensing circuit (e.g., VS1-VS8) is shown connected across each coil (L1-L8) to sense the status of the voltage across its corresponding coil. The output of each voltage sensing circuit is then fed to control logic module 501. The outputs of the voltage sensing circuits are used to determine the position (and direction) of the PMA 30 relative to the ICA 20.

A direction detector 503 coupled to PMA 30, and/or between PMA 30 and ICA 20, senses whether the PMA 30 is moving up or down relative to the coils and produces a direction indicator signal 504 which is fed to the control logic module 501. In response to the direction indicator signal 504 and the voltage sensing signals which are used as signals indicating the position of the PMA 30, the control logic module 501 produces control signals g1-g8 which turn on and off the shorting switches (Si) such that: (a) the active or excited coils opposite and close to the PMA 30 are coupled via turned on or closed switches across output lines 310 and 312 to which a load (e.g., power converter/rectifier 520) is connected; and (b) the inactive or unproductive coils are shorted out (or open circuited as shown in FIGS. 9-12). This allows for the generation of the appropriate voltages in the "excited" coils (as illustrated in FIG. 7) which are supplied via turned on switches to power collection circuitry which includes power converter/rectifier 520 coupled across the output lines 310, 312. The output of the power converter 520 may be a d.c. voltage as indicated in the drawing of FIGS. 5 and 5A.

FIG. 5A illustrates that instead of a control logic module 501, a microprocessor or (micro)-computer 505, responsive to the outputs of a position and direction detector 503, may be programmed and used to control the turn on and turn off the bypass or shorting switches (Si) connected to or across the coils in order to produce voltages across the output points 310 and 312 which are applied to power converter 520.

Figure 2:
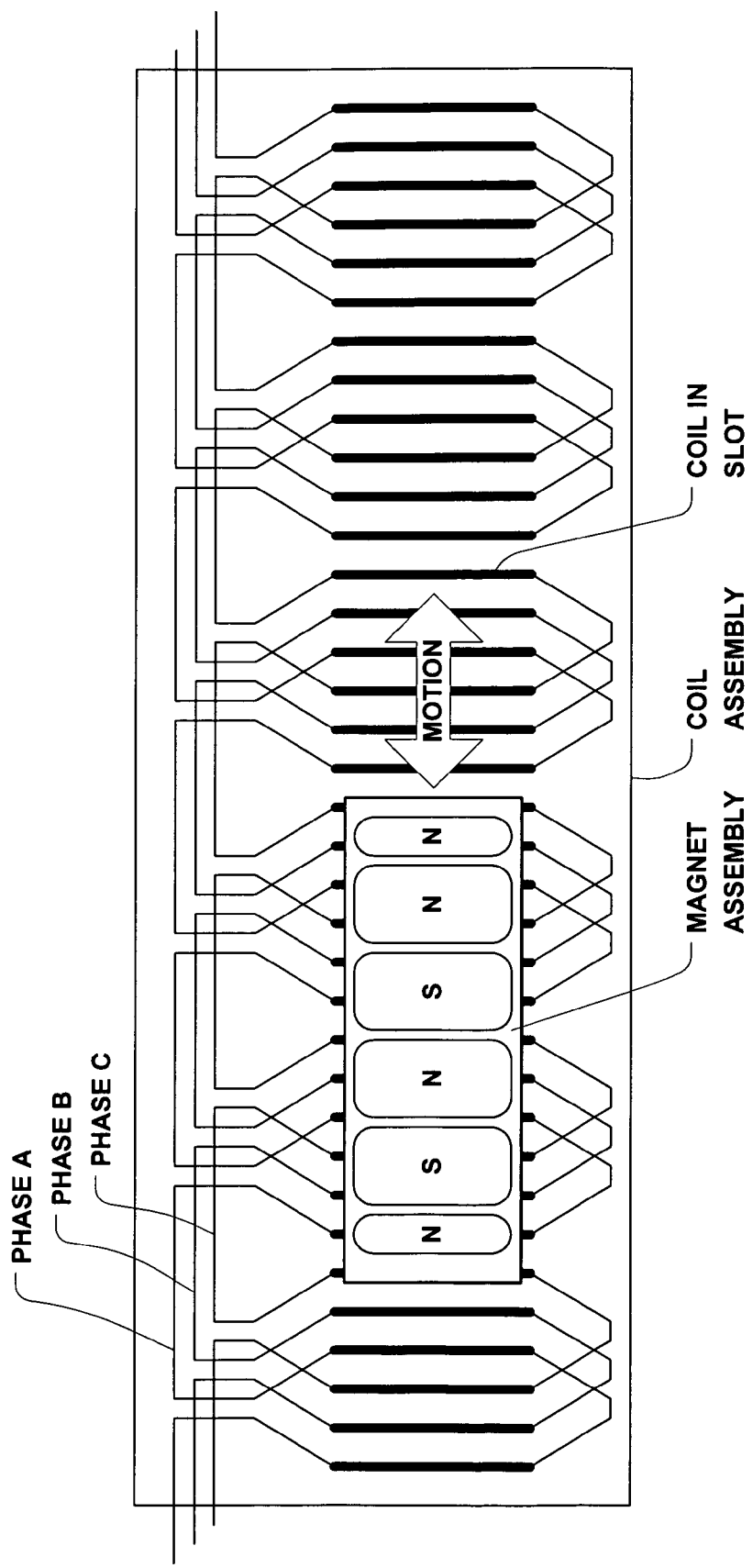
FIG. 2 is a symbolic representation of the permanent magnet and coil assemblies of a prior art LEG.
Figure 6B:
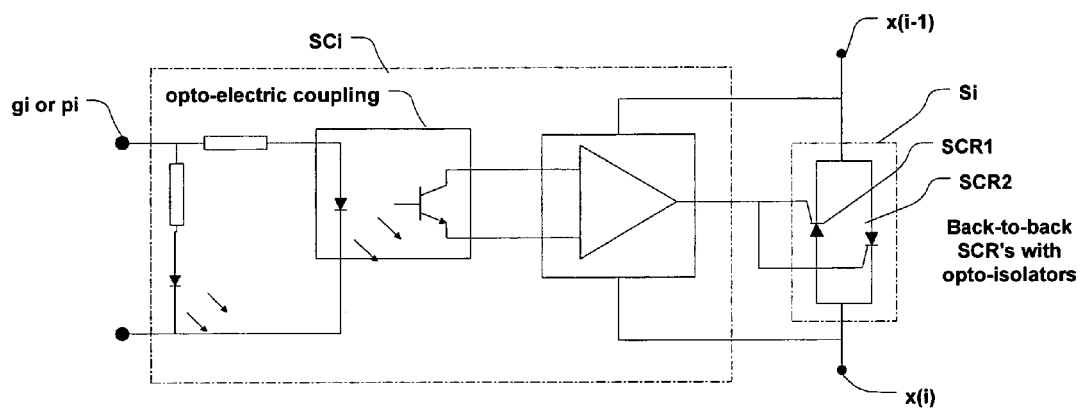

The switches S1-S8 or Si shown in the various figures may be of the type shown in FIGS. 6B, 6C 6C1, 6C2 and 6C3 and may be driven by circuitry of the type shown in block form in FIGS. 6A1 and 6A2 and of the type shown schematically in FIGS. 6B, 6C, 6C1, 6C2, and 6C3. However, it should be appreciated that any suitable switch and driver circuit may be used to perform the desired switching functions illustrated in the figures. In response to the movement of the PMA 30 across the coils, in any direction, a voltage of a sinusoidal nature is produced across the coils, as shown in FIGS. 7, 7A and 7B. Whether the PMA 30 is moving in one direction (e.g., down), or in the opposite direction (e.g., up), this type of voltage will be produced. The only difference will be in the phasing, but this is not material in this power generation and collecting arrangement.

FIGS. 6A1 and 6A2 illustrate that associated with each coil Li there is a resistive (parasitic) element Ri connected in series between nodes x(i-1) and xi. In some embodiments a selectively enabled/disabled shorting switch (Si) is connected across the coil. The turn-on (closing) and turn-off (opening) of the switch Si is controlled by a switch control module (SCi). In FIG. 6A1, the switch control modules (SCi) are controlled by the outputs (Pi) of several, selected, voltage sensing (VSi) circuits. In Fig, 6A2, the status of control module SCi and its correspond switch Si is controlled by a trigger signal gi. The trigger signal gi is produced by control logic module 501 in response to: (a) one (or more) positional control signal(s) produced by a voltage sensing module coupled across the coil; and (b) a signal 504 indicative of the position and/or direction of travel of PMA 30 relative to ICA 20.

Figure 6C:
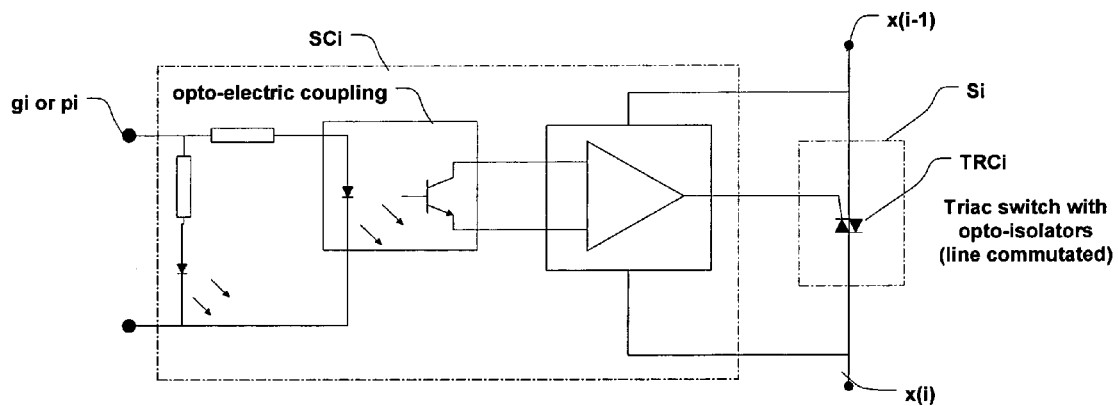
Figure 7A:
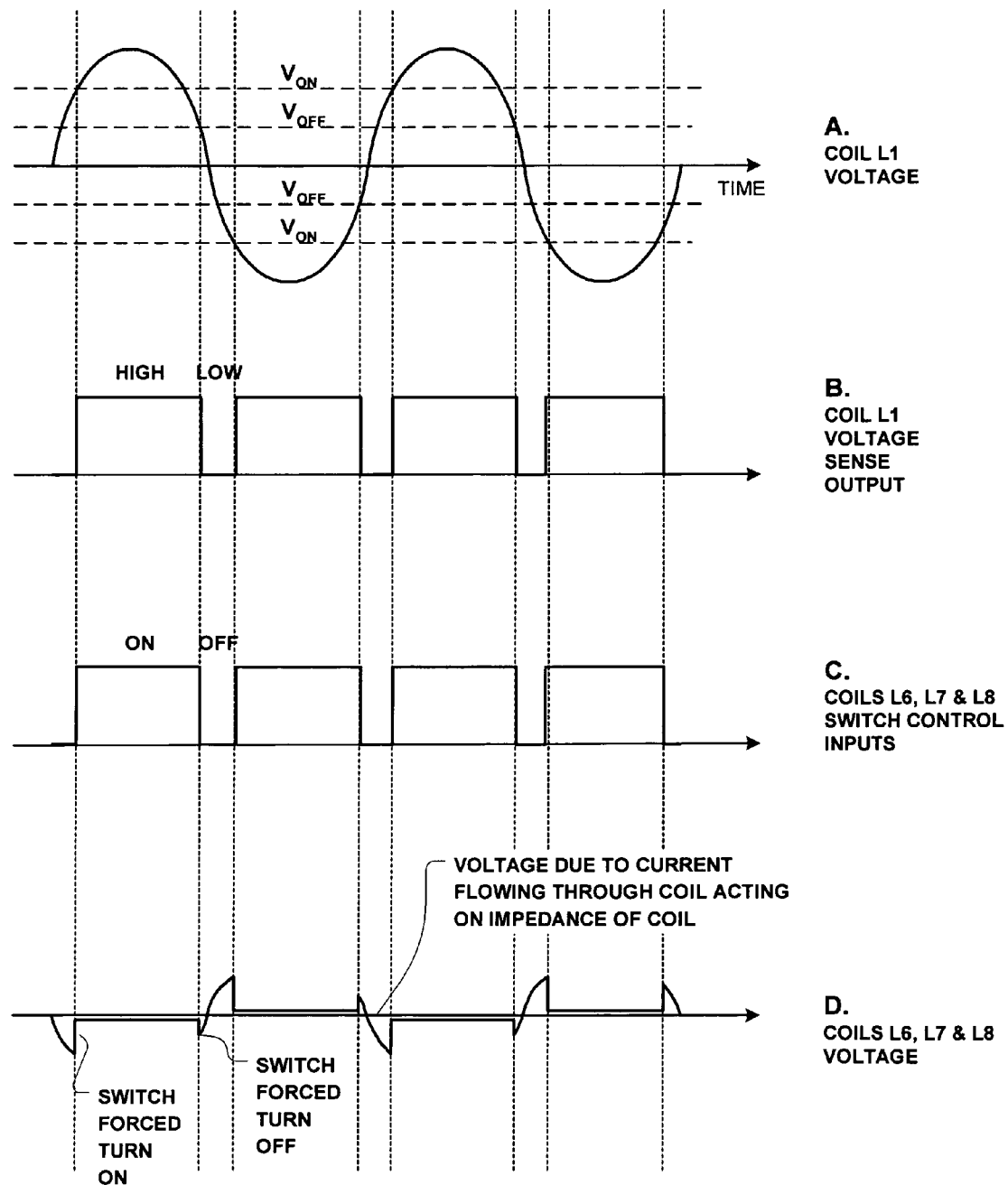
FIGS. 7A and 7B illustrate different modes of sensing voltage levels to control the turn-on and turn-off of switching circuitry associated with the ICA.
Figure 7B:
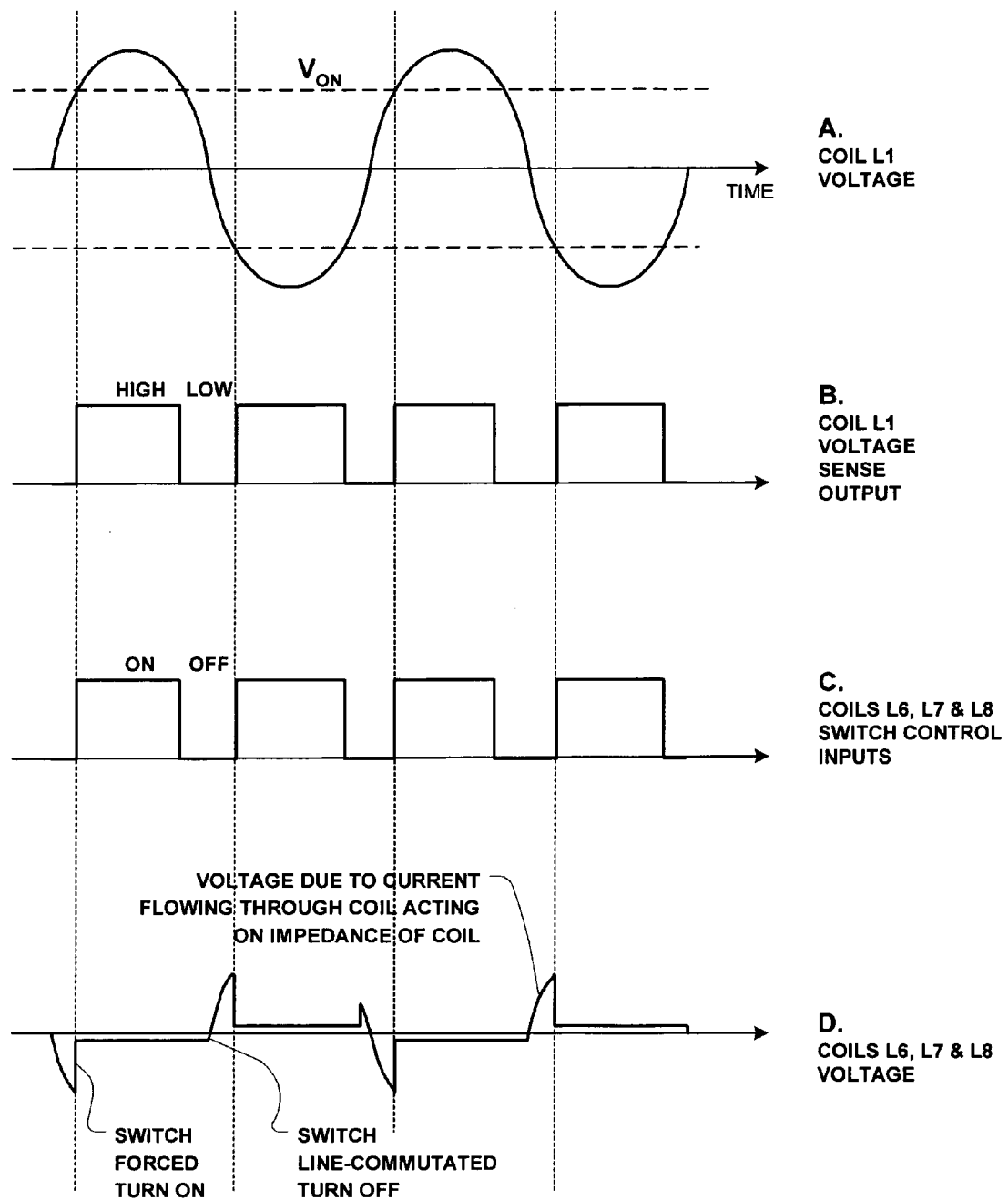

FIGS. 6B and 6C are semi-schematic semi-block diagram representations of switch control and shorting switch circuitry useful in the circuits of FIGS. 6A1 and 6A2. FIG. 6B shows back-to-back silicon-controlled rectifiers (SCR1, SCR2) used as the shorting switches with opto-isolators to couple and apply signals to the control electrodes of the SCRs. In FIG. 6C TRIACS are used as the shorting switches. The opto-isolators respond to voltage either directly from the coil voltage sensing circuits or from digital controllers. The SCR and TRIAC switches are "triggered" on by the opto-isolator drive circuit. The SCR or TRIAC switches turn off when the voltage across the power terminals reverses. This switch behavior may simplify the control circuitry for the SCR and TRIAC switches. An important aspect of using these types of switches is that these "shorting" switches which include SCRs and TRIACs turn off automatically when an AC voltages applied across their main conduction paths swings close to zero and/or reverses polarity. Alternatively, the shorting switches (S1-S8) may be part of solid state relays or solid state latches.

FIGS. 6C1, 6C2 and 6C3 shows three type of switches (Si) with three different behaviors. The FIG. 6C1 type switch Si turns on (and remains in that state) when it receives an "on" signal from the switch controller. The same switch turns off (and remains off) when it receives an "off" signal from the switch controller. Control signals are required from the switch controller to both turn on and turn off the bypass or shorting switch. An example of this type of switch is an electromechanical relay.

FIG. 6C2 shows a "triggered" type switch (Si) The switch turns on (closes) when a control signal is received and is applied to the gate. The switch turns off (opens) when the voltage across the switch (between V+ and V− terminals) goes negative or the current through the switch decreases below a minimum value. SCR and TRIAC switches are examples of these "triggered" and "line commutated" switches. These switches may be self-quenching, easing the drive/control circuitry.

FIG. 6C3 shows a "non-latching" or "threshold" switch. The switch turns on (closes) when the control signal voltage exceeds a "turn-on" threshold. The switch turns off (opens) when the control signal voltage drops below a "turn-off" threshold. Solid-state switches or non-latching relays are examples of this type of switch.

The waveforms of FIG. 7 help explain the operation of a LEG embodying the invention. Waveform A suggests a sinusoidal motion for the PMA 30 which may well be encountered in WECs driven by the waves of a body of water in which the WEC is placed. Waveforms B, C, D, E, F and G illustrate the voltages produced across individual coils when the PMA passes over or in close proximity to the coils.

Waveform H of FIG. 7 represents the composite or total voltage seen across the power terminals (310, 312) when coil switching embodying the invention is employed. That is, the inactive coils are shorted out while the "active" coils are connected across lines 310 and 312. Waveform I of FIG. 7 represents the prior art composite voltage seen across the power terminals without the benefit of the coil switching of the invention. The voltage (e.g., waveform H) generated across the power terminals (310, 312), when only the excited coils are switched across the output power lines, is of larger amplitude than that shown in waveform I, when all the coils are connected in series across the power lines. Thus, the comparison of waveforms H and I indicates that the amplitude of the voltage produced in systems embodying the invention is significantly greater than that obtained in prior art systems. Consequently a significant benefit is obtained with circuits embodying the invention by reducing the power losses.

FIG. 7A shows the expected behavior with a "threshold" type switch. Waveform A of FIG. 7A shows an idealized A.C. voltage produced across an active coil (e.g., Coil L1). When the coil voltage of Coil L1 rises to a voltage equal to Von1, sensing circuitry sensing the coil voltage sense output goes "high", as shown in waveform B. When the coil voltage drops below Voff1 the coil voltage sense output goes "low" until the coil voltage exceeds Von2. When sensed voltage is output is high, the control voltage for inactive coils that are not near the active coil (e.g. Coil L6, L7 and L8) goes "high", or "on" as shown in waveform C and the bypass (shorting) switches connected across these coils is turned on, shorting these coils and causing the voltages of these coils to be low. The voltage of these non-active coils is initially high due to the current generated by the active coils passing through the resistance and inductance of the inactive coils. This process is reversed (i.e. inactive coil switches turned off) when the voltage of the active coil drops below another voltage threshold Voff2. Waveform D shows that using the voltage sensing scheme some current flows through the inactive coils until the voltage across the active coils reaches Von1 or Von2. As a result there is some power dissipation, but it is very limited.

FIG. 7B shows the expected behavior with a "triggered" or "line-commutated" type switch. Waveform A of FIG. 7B shows an idealized coil voltage, like waveform A of FIG. 7A. When the voltage of this coil (Coil L1) rises to a voltage equal to Von, the circuit sensing the voltage of this coil (Coil L1) goes "high", as shown in waveform B and the control voltage for the inactive coils that are not near the active coil (e.g. Coil L6, L7 and L8) goes "high", or "on", as shown in waveform C. When the bypass switch of these inactive coils is turned on, the voltage of these coils goes low. The voltage of these non-active coils is initially high due to the current passing through the resistance and inductance of the inactive coils. Due to the nature of the switch device, the switch will stay on until either the current drops below a "holding" current or the voltage across the power terminals of the device reverses. Using a triggered or line commutated switch, a turn-off control signal may not be not required.

Figure 8A:
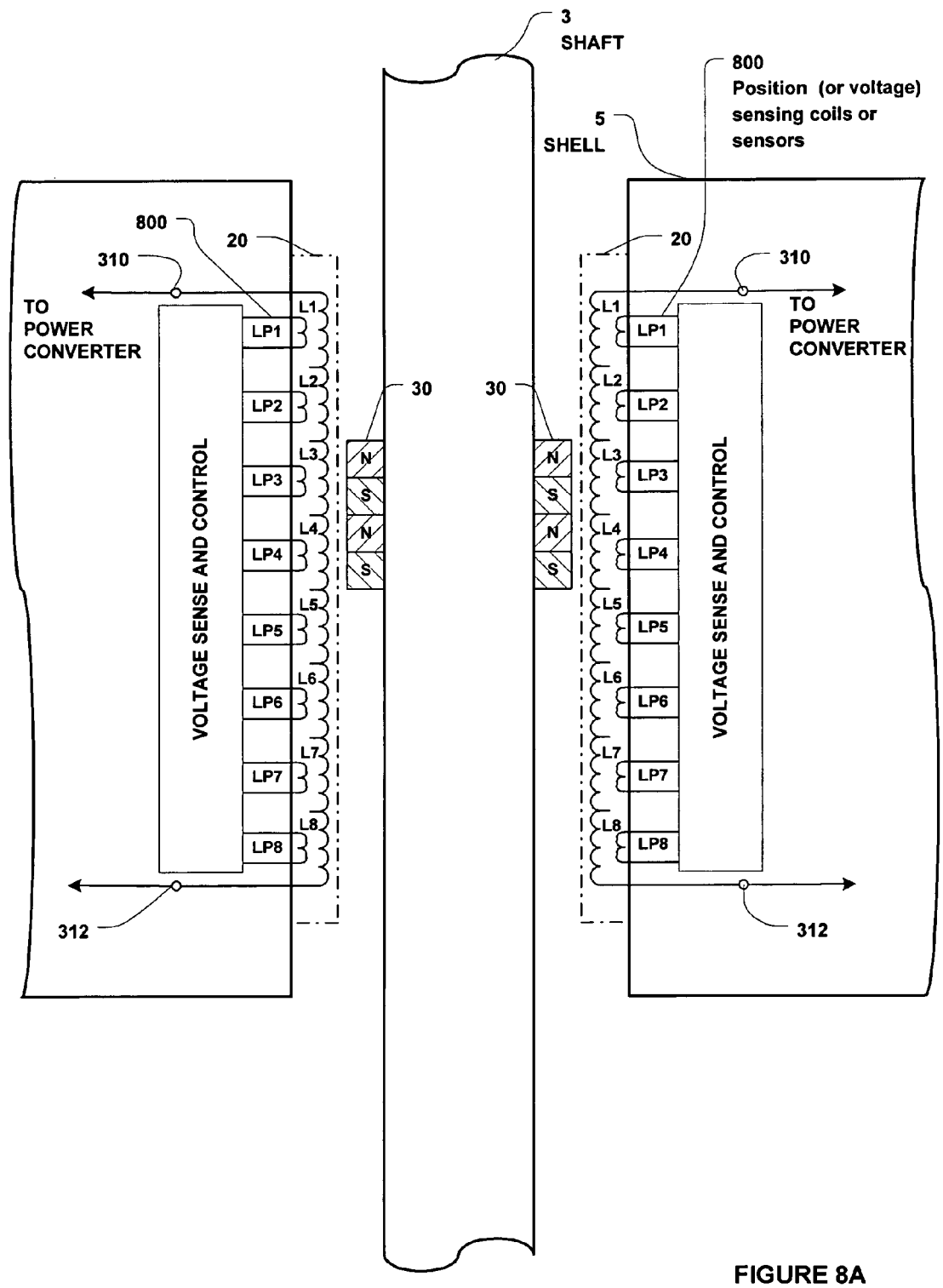
FIGS. 8A and 8B are semi-schematic semi-block diagrams of apparatus for sensing the position and direction of the PMA relative to the ICA.

FIG. 8A illustrates that, in a WEC system, an additional "position sensing" coil assembly 800, disposed alongside ICA 20, may be used to sense the position of the PMA 30 as it passes by the power generating coil assemblies 20. The position sensing coils (LP1 through LP8) in assembly 800 produce signals which may be coupled to various modules of the type shown in FIGS. 5, 5A, 6A1 and 6A2 to generate the control signals used to turn-on and turn-off of the shorting switches and/or bypass switches used in FIGS. 9, 9A, 9B, 9C, 11 and 12.

Figure 8B:
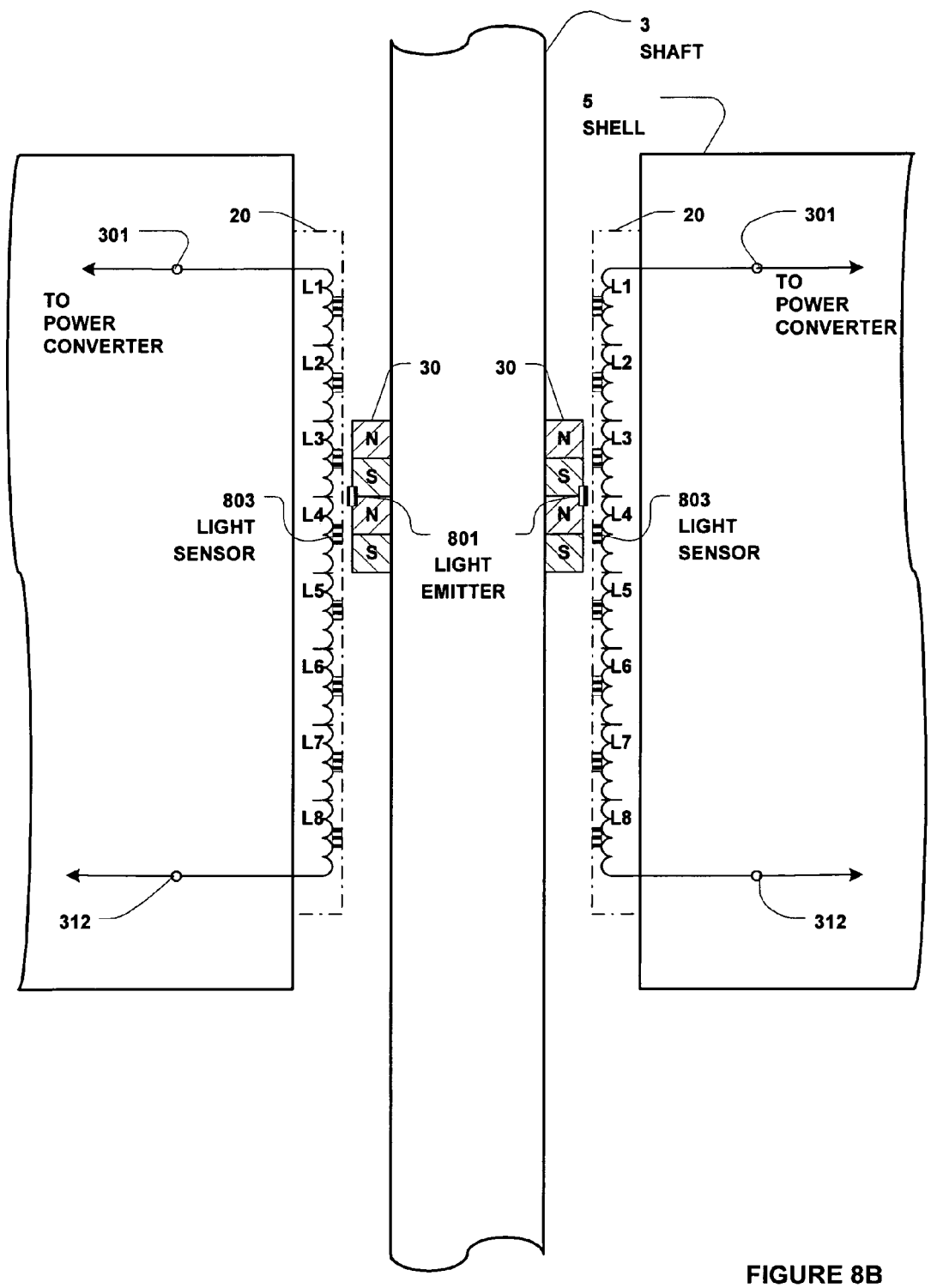

FIG. 8B illustrates that one or more light emitting elements (801) may be attached to the PMA 30 and light receptors/sensors 803 may be coupled to and along the coils to enable the position (and direction) of the PMA 30 to be sensed as it moves across the coils. Feeding this information to a control logic module as shown in FIG. 5 or to a processor as shown in FIG. 5A also permits the calculation of the speed of the shaft 3 (i.e., PMA 30) relative to the shell 5 (i.e.,ICA 20) which calculation may be used for selected system functions, including preparation of the switches for switching at the appropriate time. Alternatively, the light emitting elements may be attached to the coils and the light sensors to the PMA.

In addition to the magnetic and light sensing schemes, capacitive sensing may be used to sense the position of the PMA 30.

Figure 8C:
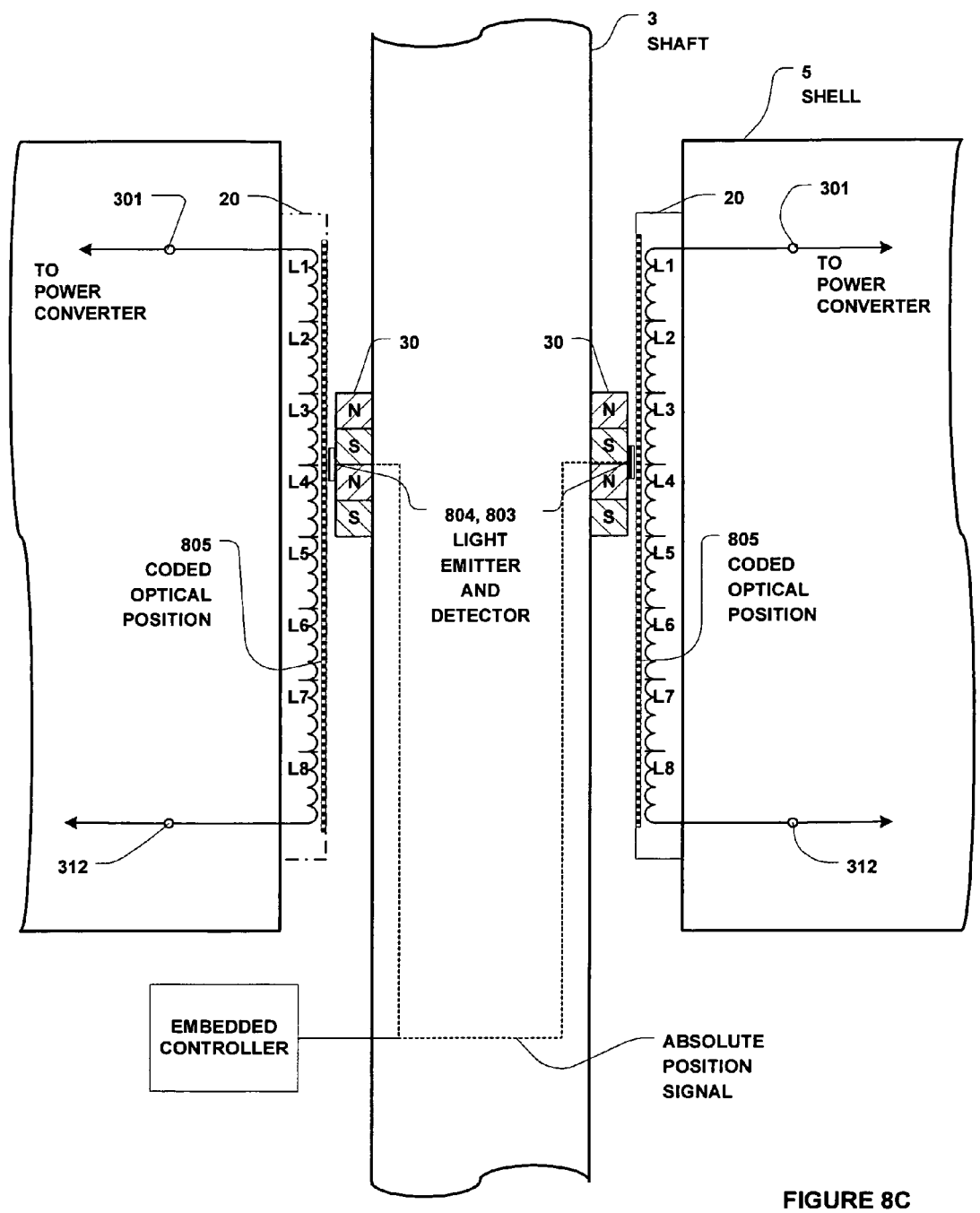
FIG. 8C is a semi-schematic semi-block diagram of apparatus for sensing the precise position and direction of a PMA relative to an ICA.

FIG. 8C illustrates that the position of the PMA 30 may be determined using an "absolute" position sensor 805 constructed of one or more light emitting elements (803), position-coded optical element, and light receptors/sensors 804. The optical sensor may be used to provide position information to an embedded controller that sends control signals to turn on and off coil switches as a function of position and direction. The use of an arrangement to sense the position of the PMA in a relatively precise manner enables the timing of the turn-on and turn-off of the switches to occur so that even the limited power dissipation seen for the case of using voltage sensing circuitry is further decreased.

In FIGS. 1 through 8, above, the structure of the induction coil assembly (ICA) may be referred to as a "tapped" series connected coil structure. That is, the coil assembly may be viewed as a single coil with multiple taps (e.g., Xo-X8 as shown in FIG. 3A). In the "tapped" structure each coil section includes a coil (Li) having first (Xi1) and second (Xi2) ends with the second end of one coil being connected to the first end of the adjacent, succeeding, coil.

Figure 9:
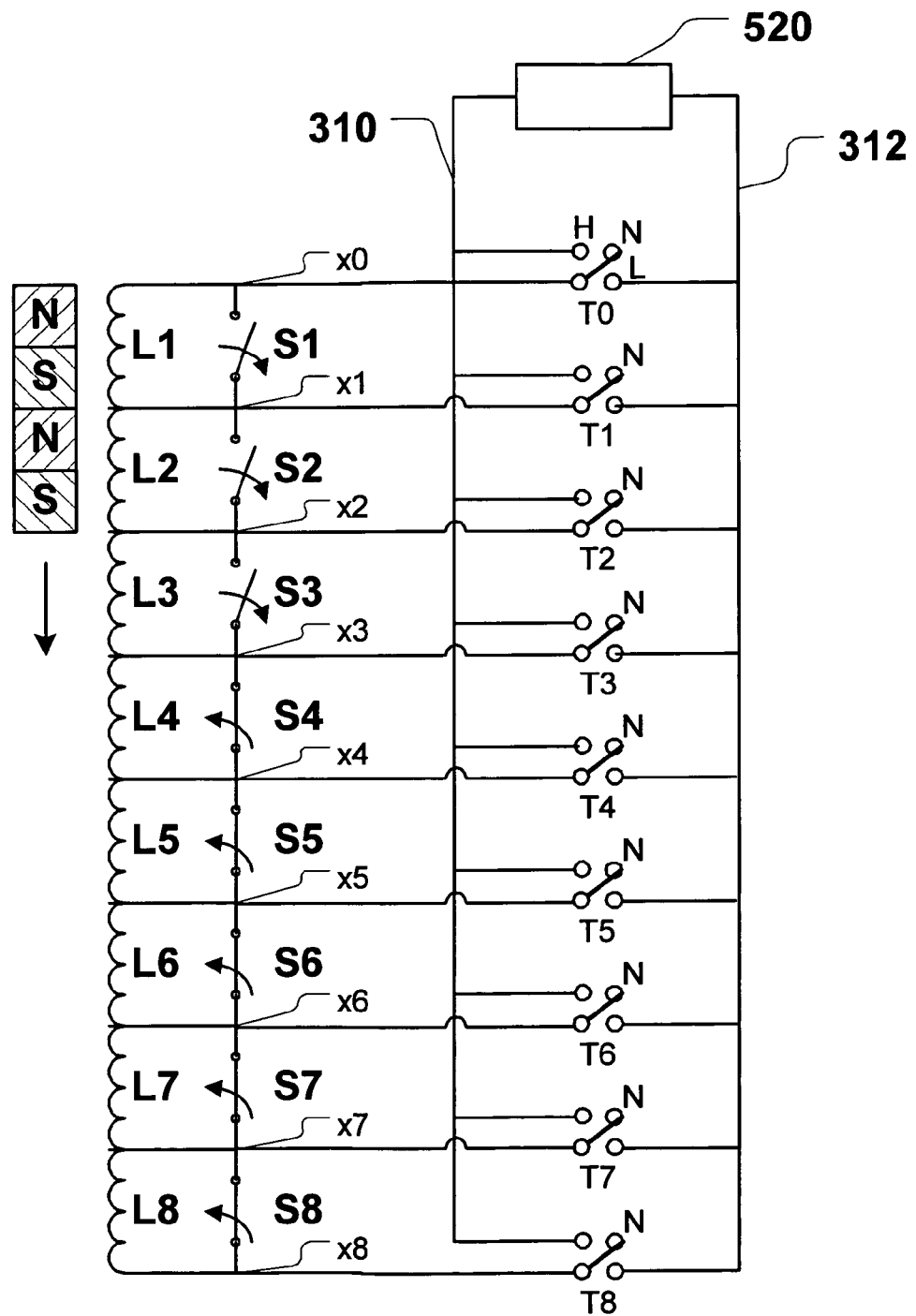
FIG. 9 is a schematic diagram of a "tapped" coil configuration in which the non-selected coils may be open-circuited in accordance with the invention.

The "tapped" ICA may also be interconnected as shown in FIG. 9. In this configuration each tap (X0-X8) of the eight series connected coils (L1-L8) is shown coupled to the center pole of a three way switch (T0-T8) which can couple the coil tap to either: (a) a high side (H) common to output line 310; (b) a neutral connection (N) shown as a floating connection; or (c) a low side (L) common to output line 312. The load or power converter 520 is connected across lines 310 and 312.

By selecting the closures of switches T0-T8, any selected number of the series coils can be connected across the load via a low impedance switch connection. It is significant to note that in this configuration each selected coil (if only one coil is selected) or a series of selected coils (if more than one coil is selected) may be connected across the load between output lines 310 and 312 via two turned on switches. Thus, in the case of long induction coil assemblies, this configuration results in fewer switches in series with the active coils and would therefore be more efficient.

Figure 9A:
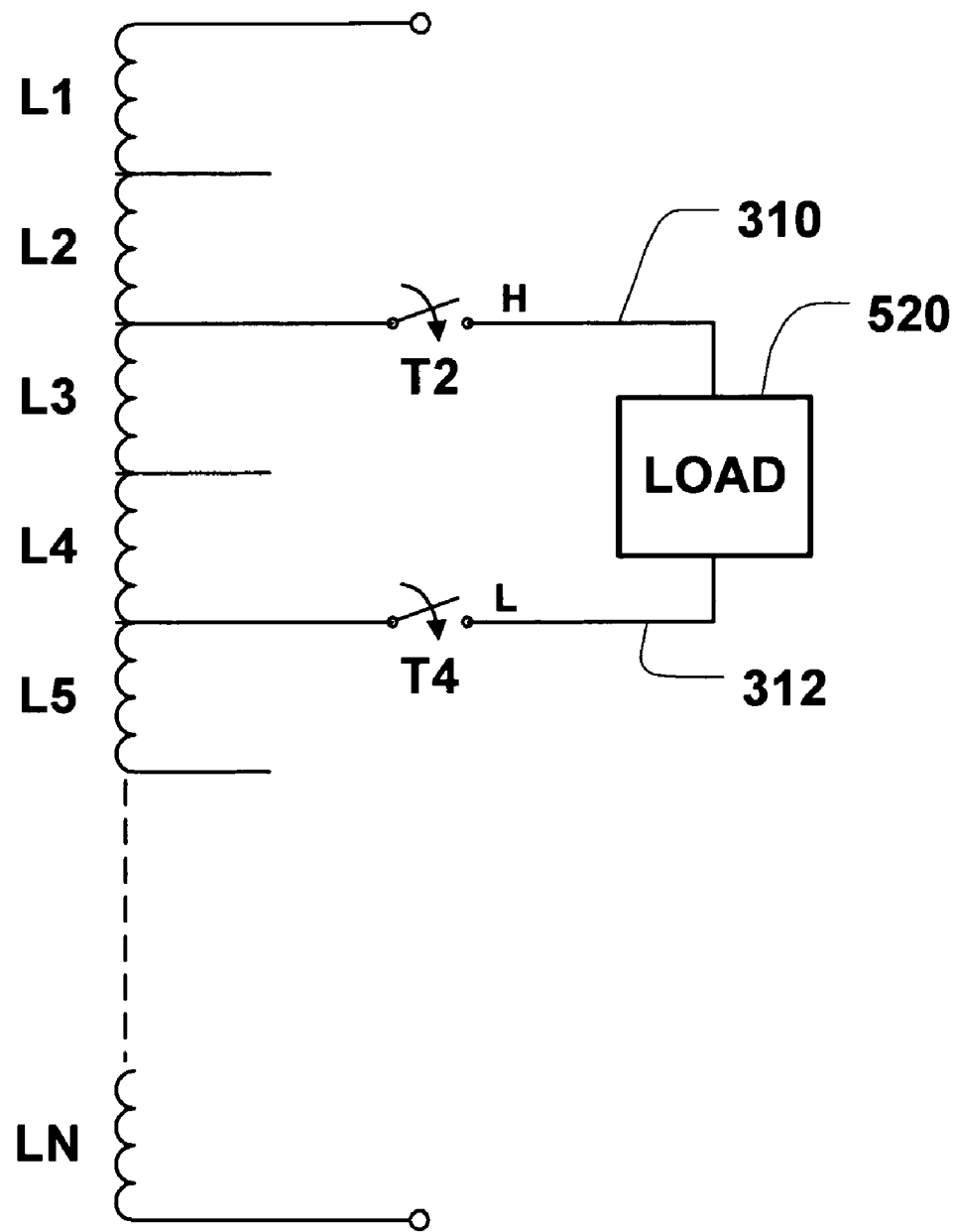
FIG. 9A is a schematic diagram of the configuration of FIG. 9 showing the selection of two coils and the bypassing of the remainder, in accordance with the invention.

Also, in contrast to the configurations shown in FIG. 3-8, in a circuit of the type shown in FIG. 9, as illustrated schematically in FIG. 9A, the non-selected (i.e., the non-activated or non-excited) coils are open circuited. This may have advantages over short circuiting the non-selected coils. In the open circuit configuration essentially no current flows in the non-selected coils. In contrast thereto, in the cases where the non-selected coils are shorted it is possible for relatively large short circuit currents to flow in the shorted coils even though the voltage induced in these coils is relatively low.

Figure 9B:
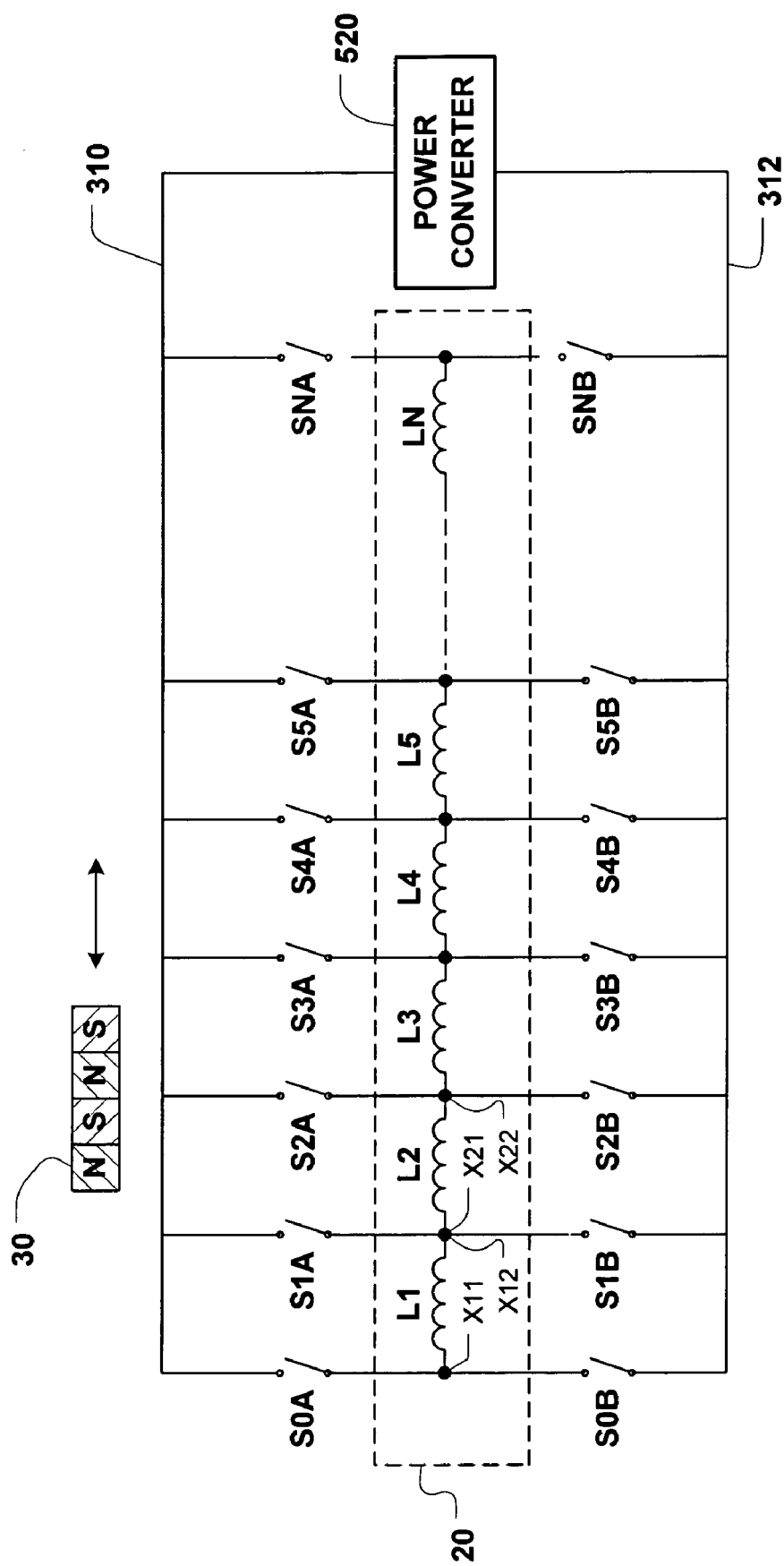
FIG. 9B is a schematic representation of switching circuitry for implementing the scheme of FIG. 9.

The LEG circuit of FIG. 9 may be implemented as shown in FIG. 9B. For a tapped coil series configuration, where each coil (Li) has first (Xi1) and second (Xi2) terminals: (a) a selectively enabled/disabled switch (S0A-SNA) is connected between each coil terminal and an output line (e.g., 310); and (b) a selectively enabled/disabled switch (SOB-SNB) is coupled between each coil terminal and the other output line (e.g., 312). As before, the load 520, illustrated as a power converter, is connected between the output lines. As discussed above, as the PMA 30 travels across the coil assembly 20, selected coils are activated and two switches corresponding to the selected coils couple the selected coil (or series connected coils) across the output lines. For example, if only coil L1 is activated or selected, then: (a) when the voltage generated at X11 is positive relative to the voltage at X12, switches S0A and S1B are closed (i.e., turned-on) and all the other switches are opened (i.e., turned-off); and (b) when the voltage at X12 is more positive than the voltage at X11, switches S1A and S0B are closed (i.e., turned-on) and all the other switches are opened (i.e., turned-off). Coils L2 through LN would then be floating and be operated as an open circuit; they are effectively disconnected from the circuit, as shown in FIG. 9A. If coils L2 and L3 were activated and/or selected, then either (a) switches S1A and S3B would be closed and all the other switches would be opened; or (b) switches S1B and S3A would be closed and all the other switches would be opened. Thus, at all times coils L2 and L3 would be connected in series between the output lines 310 and 312 via two turned on switches. This process would be repeated for all combinations and cases. If coils L3, L4 and L5 were activated, or selected, then switched S2A and S5B would be closed (turned-on) and the rest of the switches would be opened (turned off).

The type of switches which may be used to practice the invention may be the switches of the type discussed above or any other suitable switches. Also, the circuitry for enabling the switches may be of the type discussed above, or any other suitable circuitry.

Applicant's invention is also applicable to an ICA structure of the type shown in FIG. 10B which may be referred to as a "segmented" induction coil assembly, or a "segmented" ICA 20b. In this configuration, each coil has first and second ends (terminals) which are not fixedly connected to any other coil. This segmented or detached configuration provides an additional degree of flexibility and enables a designer to connect the coils via switching circuits to obtain different configurations and modes of operation.

A segmented ICA may be interconnected as shown in FIGS. 11A, 11B, 11C, and in equivalent schematic diagram 11D which illustrate that the coils may be connected in a parallel configuration between output lines 310 and 312. A problem to be resolved in this configuration is that those coils which are not "active" or "excited" would function as a short circuit or very low impedance path between the output lines and thus dissipate the energy generated by the excited coils. It is therefore necessary to remove (open) the unexcited or inactive coils rather than by-pass them as in the case of the series coil configuration described above. In these parallel configurations, each coil (Li) is essentially coupled via a corresponding switch (Si) between the output lines 310, 312. The coils are arranged such that each switch (Si) switches its corresponding coil in or out of the circuit in a sequence controlled by the position of the PMA 30 relative to the ICA 20 moves along the coils. The turn on and turn off of the "coupling" or "decoupling" switches in the parallel configurations (instead of shorting or by-passing as in the case of series configuration) may be controlled in a similar manner to that described above for the series configuration.

Figure 12:
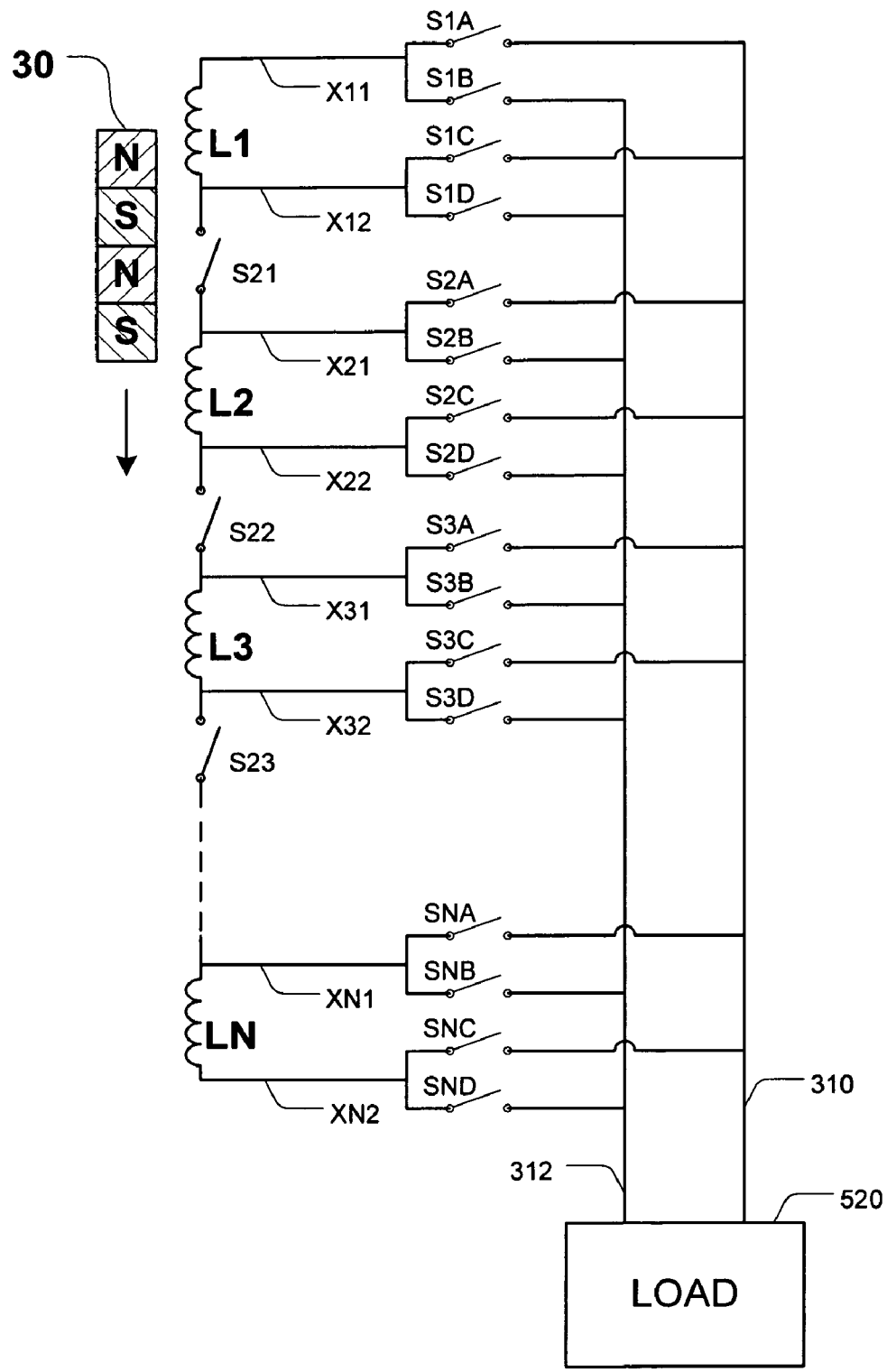
FIG. 12 is a schematic diagram of a segmented ICA interconnected in accordance with the invention.
Figure 12A:
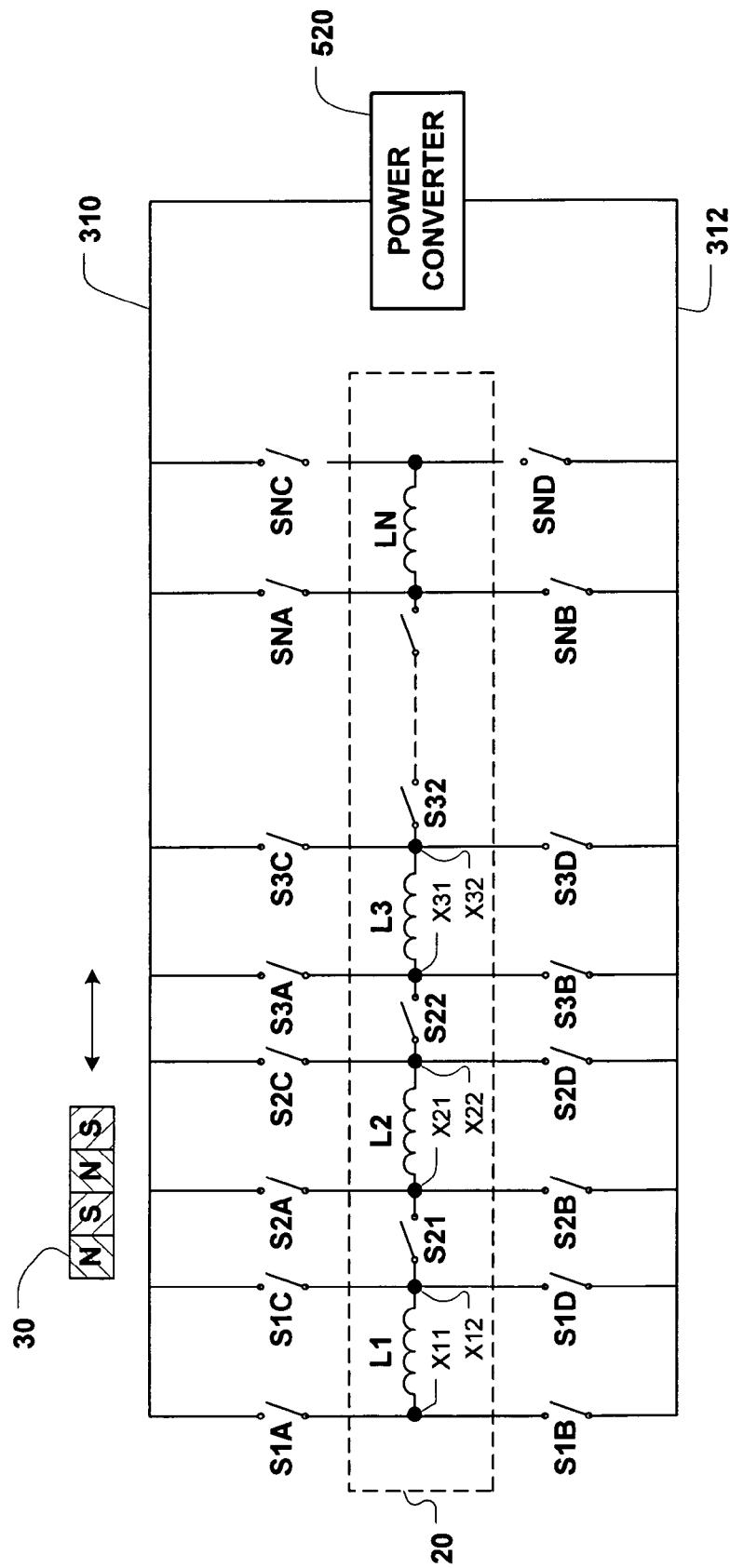

An alternate interconnection of a segmented ICA is shown in FIG. 12 and in a more schematic manner in FIG. 12A. In the configuration of FIGS. 12 and 12A, each coil section (L1-L8) may be connected to an adjacent section by means of a switch (S2i). Each coil section (Li) has two ends (Xi1, Xi2). The two ends of each coil (e.g., Xi1, Xi2) are coupled to the central point of two switches similarly to the switch configuration of FIG. 9B. One end (Xi1) of each coil is coupled via a switch SiA to output line 310 and via a switch SiB to the other output line 312. The other end (Xi2) of each coil is coupled via a switch SiC to line 310 and via a switch SiD to output line 312. These switches enable the selection of one or more coils and for connecting the selected coils in series and then enabling the selected coils to be connected via the low impedance of two switches across the power converter 520 or any other suitable load. The non-selected coils are essentially open-circuited and they are effectively by-passed.

What is claimed is:

1. A linear electric generator (LEG) comprising: a coil assembly comprising N sections of induction coils disposed linearly along a distance d1; the coils exhibiting inductance and resistance along their length; a magnetic assembly of length d2, where d2 is smaller than d1; means for passing the magnetic assembly along and over the linearly disposed induction coils while maintaining a small gap between the magnetic assembly and the coils, the passing of the magnetic assembly over a particular coil section causing that particular coil section to be excited in that it produces a voltage across the coils in that particular section; first and second output points for producing therebetween a voltage corresponding to the voltage generated across the coils due to the passing magnetic assembly; and switching means coupled between the coils and the first and second output points for selectively coupling only sections of coils in close proximity to the passing magnetic assembly between the first and second output points, whereby sections of coils which are not in close proximity to the magnetic assembly are disconnected from the first and second output points thereby reducing power losses and increasing the power producing efficiency of the LEG.

2. The LEG as claimed in claim 1, wherein said switching means includes N selectively enabled switches, one switch per coil, each switch connected across its coil section for selectively shorting out its corresponding coil section when not in close proximity to the magnetic assembly; said switches exhibiting a very low impedance when turned-on or closed and a high impedance when turned-off or open; and wherein a load is coupled across said first and second output points; and wherein excited coils are coupled between said first and second outputs points and said load via a low impedance path provided by said switching means.

3. The LEG as claimed in claim 2, wherein the switches corresponding to the coil sections in close proximity to the magnetic assembly are opened for enabling a voltage to be developed across the coil sections in close proximity to the magnetic assembly; and wherein the switches associated with the coil sections not in close proximity to the magnetic assembly are closed for shorting out their corresponding coil section and concurrently providing a path for the selected excited coils producing a voltage.

4. The LEG as claimed in claim 2, wherein the N coil sections are connected end to end between said first and second output points.

5. The LEG as claimed in claim 4 wherein said switching means includes means for sensing at least one of the position and direction of the magnetic assembly relative to the coil sections for producing signals to control the turn-on and turn-off of the switches, for enabling only selected coils in close proximity to the magnetic assembly to be coupled across the first and second output points.

6. The LEG as claimed in claim 5 wherein said switching means includes voltage sensing means coupled across the coil sections for sensing the voltages induced across the coils as a function of their proximity to the magnetic assembly and for producing signals to control the turn-on and turn-off of the switches, for enabling only selected coils in close proximity to the magnetic assembly to be coupled across the first and second output points.

7. The LEG as claimed in claim 6, wherein said switching means includes switch control circuitry coupled to said voltage sensing means for applying turn-on signals to selected shorting switches connected across the coil sections; and wherein each switch is controlled by a switch control circuit; and wherein each switch control circuit is in turn controlled by a voltage sensing circuit.

8. The LEG as claimed in claim 5, wherein there is a switch connected across each coil section; and wherein each switch is controlled by a switch control circuit; and wherein each switch control circuit is coupled to a control logic module for selectively turning on the switch to short out its corresponding coil section or for maintaining a switch associated with a coil section turned-off to enable a voltage to be developed across the coil section and to be coupled across the first and second output points.

9. The LEG as claimed in claim 8, wherein said switching means includes sensing means for supplying signals to said control logic module pertaining to at least one of: (a) the position of the magnetic assembly relative to the coil assembly; (b) the direction of the magnetic assembly relative to the coil assembly; and (c) outputs of coil voltage sensing circuits.

10. The LEG as claimed in claim 2, wherein each one of said N selectively enabled switches is one of a silicon controlled rectifier (SCR), a TRIAC, a relay contact, a triggered solid-state switch, a latching switch and a non-latching switch.

11. The LEG as claimed in claim 1, wherein a position sensing coil for sensing the position of the magnetic assembly relative to the coil assembly is disposed along the N sections of induction coils for providing signals pertaining to the position of the magnetic assembly relative to the coil assembly for controlling the switching means and enabling only the voltages developed across the coils in close proximity to the magnetic assembly to be coupled between said first and second points.

12. The LEG as claimed in claim 1, wherein light emitting elements are attached to one of the magnetic assembly and the coil sections and light sensors are connected to the other one of the magnetic assembly and the coil sections for sensing the position of the magnetic assembly and for providing signals for controlling the switching means and enabling only the voltages developed across the coils in close proximity to the magnetic assembly to be coupled between said first and second points.

13. The LEG as claimed in claim 1, wherein optical light sensing means are disposed along the coils and a corresponding light emitting means is disposed on the magnetic assembly for sensing the position of the magnetic assembly and for providing signals for controlling the switching means and enabling only the voltages developed across the coils in close proximity to the magnetic assembly to be coupled between said first and second points.

14. The LEG as claimed in claim 1, wherein said N sections of coils are connected end to end across said first and second output points; and wherein said switching means includes a selectively enabled/disabled switch connected across each one of said N sections of coils.

15. The LEG as claimed in claim 1, wherein each section of coil has first and second terminals; and wherein said switching means includes: (a) a first set of selectively enabled switches connected between the first terminals of each one of said coil sections and said first output point; and (b) a second set of selectively enabled switches connected between the second terminals of each one of said coil sections and said second output point.

16. The LEG as claimed in claim 15 wherein selected coils in close proximity to the magnetic assembly are coupled via a selectively enabled switch from said first set to said first output point and via a corresponding selectively enabled switch from said second set to said second output point.

17. The LEG as claimed in claim 16, wherein the non selected coils which are not in close proximity to the magnetic assembly are open circuited and wherein the selected coils in close proximity to the magnetic assembly are connected in series via a switch from said first set and a switch from said second set across said first and second output points.

18. The LEG as claimed in claim 1, wherein the means for passing the magnetic assembly over and along the coils includes disposing the coils along one of a float and column of a wave energy converter (WEC) intended to be placed in a body of water and wherein the magnetic assembly is attached to the other one of the float and column; and wherein the float and column can move relative to each other and are part of the wave energy converter (WEC).

19. The LEG as claimed in claim 1, wherein the means for passing the magnetic assembly over and along the coils includes disposing the coils along one of a float and column and wherein the magnetic assembly is attached to the other one of the float and column for enabling at least one of the following: (a) the coils to be stationary and the magnetic assembly to move up and down relative to the coils; (b) the magnetic assembly to be stationary and the coils to move up and down relative to the magnetic assembly; and (c) the magnetic assembly and the coils to move relative to each other.

20. A combination comprising:
a coil assembly including N sections of induction coils connected in series and extending end to end along a support structure for a distance d1; the coils exhibiting inductance and resistance along their length; a permanent magnetic assembly (PMA) of length d2, where d2 is smaller than d1, means for passing the PMA along and over the induction coils while maintaining a small gap between the magnet and the coils, the passing of the PMA over a coil section causing that coil section to be excited in that it produces a voltage across the coils in that coil section; and switching means coupled to the coils for selectively coupling only selected sections of coils in close proximity to the passing PMA between first and second output points via said selected switching means, whereby sections of coils which are not in close proximity to the magnetic assembly are disconnected from the first and second output points thereby reducing power losses and increasing power producing efficiency.

21. The combination as claimed in claim 20, wherein a load is connected between said first and second output points, and wherein said selected sections of coils produce a voltage across said load.

22. The combination as claimed in claim 21, wherein said switching means includes N selectively enabled shorting switches, one switch per coil, each switch being connected across its corresponding coil section for selectively shorting out its corresponding coil section.

23. The combination as claimed in claim 22, wherein the shorting switches connected across the coils in close proximity to the PMA are opened and the shorting switches across the coils which are not in close proximity to the PMA are closed for shorting out their corresponding coil section.

24. The combination as claimed in claim 20, wherein the means for passing the magnetic assembly over and along the coils includes disposing the coils along one of a float and column of a wave energy converter (WEC) and wherein the magnetic assembly is attached to the other one of the float and column of the WEC; and wherein the float and column can move relative to each other.

25. The combination as claimed in claim 20 wherein each coil section has first and second terminals, and wherein each coil terminal is coupled via a first selectively enabled switch to said first output point and via a second selectively enabled switch to said second output point for enabling each terminal to be selectively coupled to one of said first and to second output points.

26. The combination as claimed in claim 25 wherein selected coil sections are coupled via selectively enabled switches between said first and second output points; and wherein the non selected coil sections are disconnected from said first and second output points by disconnecting at least one of their first and second terminals from one of said first and second output point.

27. The combination as claimed in claim 20 wherein the N coil sections define a tapped coil configuration.

28. The combination as claimed in claim 20 wherein the N coil sections define a segmented coil configuration.

29. The combination as claimed in claim 20 wherein said switching means includes switches for selectively coupling selected active coils in series between said first and second output points and for disconnecting non-selected inactive coils from said first and second output points, whereby the non-selected coils are effectively open circuited.

30. The combination as claimed in claim 20, wherein each one of said N induction coils has first and second terminals; and wherein adjacent coils share a common terminal, the second terminal of one coil being common to the first terminal of an adjacent coil, whereby the N sections of induction coils are physically and electrically connected in series between said first and second output points.

31. The combination as claimed in claim 30 wherein there are N-1 taps formed between said first and second output points to enable said switching means to be connected to said N sections of coils.

32. The combination as claimed in claim 20 wherein said switching means includes means for sensing at least one of position and direction for controlling the coupling of the coil sections between the first and second output points.

33. A combination comprising:
a coil assembly including N sections of induction coils extending end to end along a support structure for a distance d1; the coils exhibiting inductance and resistance along their length; a permanent magnetic assembly (PMA) of length d2; means for passing the PMA along and over the induction coils while maintaining a small gap between the magnet and the coils, the passing of the PMA over a coil section causing that coil section to be excited in that it produces a voltage across the coils in that coil section; and switching means coupled to the coils for selectively coupling only selected sections of coils in close proximity to the passing PMA between first and second output points via said selected switching means, whereby sections of coils which are not in close proximity to the magnetic assembly are disconnected from the first and second output points thereby reducing power losses and increasing the power producing efficiency.

* * * * *